(12) United States Patent
Billson et al.

(10) Patent No.: US 9,673,743 B1
(45) Date of Patent: Jun. 6, 2017

(54) EFFICIENT MOTOR CONTROL

(71) Applicant: Limiter Power Management System (PTY) LTD., Port Elizabeth, Eastern Cape (ZA)

(72) Inventors: Terrence Hugh Billson, Port Elizabeth (ZA); Henry Du Preez, Sandton (ZA); Shaun Trevor Fish, Boksburg (ZA); Sean Barry Melrose, Brentwood (ZA)

(73) Assignee: Limiter Power Management System (PTY) LTD., Port Elizabeth, Eastern Cape (ZA)

( * ) Notice: Subject to any disclaimer, the term of this patent is extended or adjusted under 35 U.S.C. 154(b) by 0 days.

(21) Appl. No.: 15/429,076

(22) Filed: Feb. 9, 2017

Related U.S. Application Data

(60) Provisional application No. 62/385,138, filed on Sep. 8, 2016.

(51) Int. Cl.
| | |
|---|---|
| *H02P 1/24* | (2006.01) |
| *H02P 23/26* | (2016.01) |
| *H02P 27/08* | (2006.01) |
| *H02P 25/02* | (2016.01) |

(52) U.S. Cl.
CPC .............. *H02P 23/26* (2016.02); *H02P 25/02* (2013.01); *H02P 27/08* (2013.01)

(58) Field of Classification Search
CPC ...... H02P 2/08; H02P 7/04; H02P 7/29; H02P 27/06
See application file for complete search history.

(56) References Cited

U.S. PATENT DOCUMENTS

| | | | |
|---|---|---|---|
| 4,823,066 | A | 4/1989 | Yoshiki et al. |
| 5,646,499 | A | 7/1997 | Doyama et al. |
| 5,796,237 | A | 8/1998 | Yamakawa et al. |
| 5,828,200 | A | 10/1998 | Ligman et al. |
| 5,883,489 | A | 3/1999 | Konrad |
| 6,316,895 | B1 | 11/2001 | Ramarathnam |
| 6,636,011 | B2 | 10/2003 | Sadasivam et al. |
| 6,856,115 | B2 | 2/2005 | Branecky |
| 6,992,448 | B2 | 1/2006 | Fujimoto et al. |
| 7,023,166 | B1 | 4/2006 | Kohen et al. |
| 7,039,542 | B2 | 5/2006 | Fujii et al. |
| 7,095,209 | B2 | 8/2006 | Thunes et al. |
| 7,309,973 | B2 | 12/2007 | Garza |

(Continued)

FOREIGN PATENT DOCUMENTS

| | | |
|---|---|---|
| EP | 1494345 | 1/2005 |
| EP | 2453571 | 3/2014 |

(Continued)

*Primary Examiner* — Karen Masih
(74) *Attorney, Agent, or Firm* — Knobbe, Martens, Olson & Bear LLP

(57) ABSTRACT

An power management unit receives AC power and, via an AC-DC-AC converter, provides an AC motor signal to a three-phase induction motor. Sensors in the power management unit provide data to a digital signal processor ("DSP"). The data includes a current of the AC motor signal. The DSP generates a PWM carrier signal to modulate a voltage amplitude of the AC motor signal, thereby improving the operating efficiency of the motor. The motor terminal voltage is reduced until limit conditions are reached, such as reaching a motor rated efficiency or when the motor current fluctuates.

29 Claims, 11 Drawing Sheets

(56) References Cited

U.S. PATENT DOCUMENTS

| | | |
|---|---|---|
| 7,696,715 B2 | 4/2010 | Fisher et al. |
| 7,902,790 B2 | 3/2011 | Arakawa et al. |
| 8,203,304 B2 | 6/2012 | Lu et al. |
| 8,217,618 B2 | 7/2012 | Cheng et al. |
| 8,232,760 B2 | 7/2012 | Lu et al. |
| 8,395,336 B2 | 3/2013 | Lai et al. |
| 8,405,341 B2 | 3/2013 | Tagome |
| 8,456,128 B2 | 6/2013 | Fotherby |
| 8,525,468 B2 | 9/2013 | Winterhalter et al. |
| 8,674,647 B2 | 3/2014 | Iwaji et al. |
| 8,796,966 B2 | 8/2014 | Peto |
| 9,024,552 B2 | 5/2015 | Tazawa et al. |
| 9,160,262 B2 | 10/2015 | Bozic et al. |
| 9,231,500 B2 | 1/2016 | Marcetic et al. |
| 9,318,989 B2 | 4/2016 | Iijima et al. |
| 9,318,992 B2 | 4/2016 | Swamy |
| 9,379,658 B2 | 6/2016 | Yoo |
| 2007/0024224 A1 | 2/2007 | McDonald |
| 2013/0013154 A1 | 1/2013 | Aoki |
| 2015/0318813 A1 | 11/2015 | West et al. |
| 2015/0381100 A1* | 12/2015 | Chen .................. H02P 27/08 318/400.29 |
| 2016/0211767 A1 | 7/2016 | Hotta |

FOREIGN PATENT DOCUMENTS

| | | |
|---|---|---|
| JP | 4008930 | 11/2007 |
| WO | WO 2009/070089 | 6/2009 |

\* cited by examiner

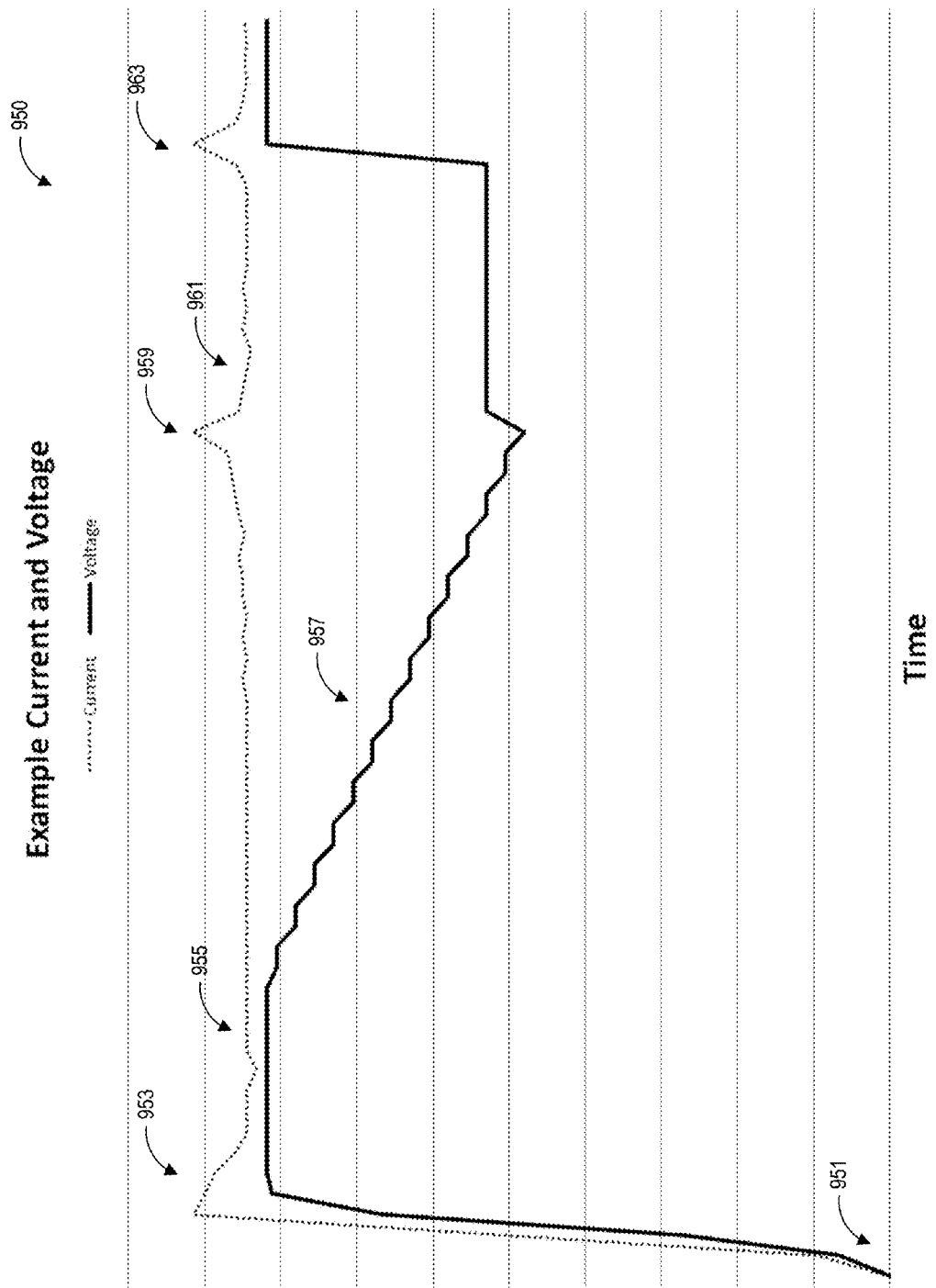

EFFICIENT MOTOR CONTROL

BACKGROUND

Technical Field

The disclosure relates to systems, apparatuses, and methods for motor control and includes electrical, computer, and mechanical design aspects of controlling three-phase induction motors with AC-DC-AC power systems.

Description of Related Technology

Motors have many applications and are used to turn various types of loads. However, a number of factors may prevent a motor from operating efficiently.

SUMMARY

An aspect of at least one of the inventions disclosed herein includes the realization that electric motor controllers can achieve higher levels of efficiency by varying motor terminal voltage in response to a detection of a change in motor current while monitoring a motor power factor. For example, during steady-state operation of an induction motor, if a motor terminal voltage is lowered, the motor will operate at greater efficiency. However, if the terminal voltage is lowered too much, there will not be sufficient electrical power to generate sufficient torque and thus maintain shaft speed. An aspect of at least one of the inventions disclosed herein includes the realization that as motor terminal voltage is lowered, prior to a substantial reduction of shaft speed, motor current increases in an unstable manner. If the voltage in such a scenario is maintained at a low level, the shaft speed of the motor will fall substantially, thus failing to operate at a desired speed. Thus, in accordance with some embodiments, a motor controller is configured to gradually reduce motor terminal voltage until instability is detected in a current. The motor terminal voltage is then raised from the voltage at which the instability is detected. The instability can precede a failure of the motor to support a load, thus, the motor controller can respond before the motor fails to support the load. As such, the motor controller can adaptively and in real-time determine the minimum voltage, and thus the maximum efficiency, that a motor can achieve under any load within its rated capability.

An embodiment of a motor control system can comprise an AC-DC-AC power delivery system configured to power a three-phase induction motor, a sensor, and a digital signal processor. The power delivery system comprises an AC to DC power rectifier configured to convert a supplied AC power signal into a DC power signal. The power delivery system also comprises a DC to AC power inverter configured to receive a pulse width modulated (PWM) signal, convert the DC power signal into an AC motor signal, and supply the AC motor signal to the three-phase induction motor, wherein a voltage amplitude of the AC motor signal is based, at least in part, on a duty cycle of the PWM signal. The sensor is configured to detect a motor current of the AC motor signal. The digital signal processor (DSP) configured to: receive an indication of the motor current, generate the PWM signal at a first duty cycle, change the duty cycle of the PWM signal until the motor current fluctuates, wherein changing the duty cycle causes a decrease in the voltage amplitude of the AC motor signal, and reverse at least a part of the change in the duty cycle of the PWM signal, thereby stabilizing the motor current at a first level.

In some embodiments, the DSP can be configured to change the duty cycle of the PWM signal until the motor current fluctuates, wherein changing the duty cycle of the PWM signal comprises decreasing the duty cycle of the PWM signal by a first amount, and reverse at least a part of the change in the duty cycle of the PWM signal, wherein reversing at least a part of the change in the duty cycle of the PWM signal comprises increasing the duty cycle of the PWM signal by a second amount to decrease the motor current to reach the first level. The second amount can be smaller than the first amount.

In some embodiments, the DSP can be configured to change the duty cycle of the PWM signal while holding constant a carrier frequency of the PWM signal and a DC voltage of the PWM signal. In some embodiments, the AC to DC power rectifier is configured to receive an AC power signal that has a steady amplitude and a steady frequency. In some embodiments, the first duty cycle is a full duty cycle.

In some embodiments, the motor control system further comprises an isolated driver stage coupled to the DSP and also coupled to the inverter. The isolated driver stage can be configured to: receive the PWM signal generated by the DSP, provide the PWM signal to the inverter, and provide isolation for the PWM signal between the DSP and the inverter.

In some embodiments, the motor control system further comprises a user input device and a memory configured to store a value for the first duty cycle. The value can be determined, based at least in part, on a user input made through the user input device.

In some embodiments, the motor control system further comprises a user input device for providing a user input and a memory configured to store a motor rated power factor. The motor rated power factor can be determined, based at least in part, on the user input. The DSP can be further configured to: calculate a first voltage amplitude for the AC motor signal based, at least in part, on the duty cycle of the PWM signal, calculate a motor power factor based, at least in part, on the first voltage amplitude and the motor current, compare the motor power factor to the motor rated power factor, and in response to the comparison of the motor power factor to the motor rated power factor, setting the duty cycle of the PWM signal to be the first duty cycle.

In some embodiments, the motor control system further comprises a user input device for providing a user input and a memory configured to store a motor rated current. The motor rated current can be determined, based at least in part, on the user input. The DSP can be further configured to compare the motor current to the motor rated current and in response to the comparison of the motor power current to the motor rated current, set the duty cycle of the PWM signal to be the first duty cycle.

In some embodiments, the DSP is further configured to, after reversing at least a part of the change in the duty cycle of the PWM signal and thereby stabilizing the motor current at the first level: detect an instability in the motor current, and in response to the detection, set the duty cycle of the PWM signal to be the first duty cycle.

In some embodiments, the DSP is further configured to perform a soft start, wherein performing the soft start comprises changing the duty cycle of the PWM signal to gradually reach the first duty cycle over a time period.

An embodiment of a method for controlling a three-phase induction motor can comprise converting a DC power supply signal into an AC motor signal; supplying the AC motor signal to the three-phase induction motor; generating the PWM signal at a first duty cycle; sensing a current of the AC motor signal supplied to the three-phase induction motor; in response to the motor reaching a steady state, changing the duty cycle of the PWM signal such that the amplitude of the AC motor signal is increased and a power factor of the three-phase induction motor is increased; reversing at least a portion of the change to set the duty cycle of the PWM signal at a second duty cycle; detecting that the current of the AC motor signal is unstable while the PWM signal is set at the second duty cycle; and in response to the detection, setting the duty cycle of the PWM signal to be the first duty cycle. The amplitude of the AC motor signal is determined, based at least in part, on the duty cycle of a pulse width modulated (PWM) signal. The reversing is performed in response to at least one of: an instability in a current of the AC motor signal or a motor power factor reaching a programmed limit.

Some embodiments of the method further comprise receiving an AC supply signal from an AC power supply and converting the AC supply signal into the DC power supply signal.

In some embodiments of the method, changing the duty cycle of the PWM signal such that the amplitude of the AC motor signal is increased and a power factor of the three-phase induction motor is increased comprises continuously or repeatedly decreasing the duty cycle of the PWM signal, and reversing at least a portion of the change to set the duty cycle of the PWM signal at a second duty cycle comprises increasing the duty cycle of the PWM signal, thereby decreasing the motor current and decreasing the power factor. The second duty cycle can be less than the first duty cycle.

In some embodiments of the method, the first duty cycle is a full duty cycle.

Some embodiments of the method further comprise receiving a user input. The first duty cycle can be based, at least in part, on the user input.

Some embodiments of the method further comprise receiving a user input. The programed limit can be based, at least in part, on the user input.

Some embodiments of the method further comprise receiving a user input for a soft start option. Generating the PWM signal at the first duty cycle can comprises gradually changing the duty cycle of the PWM signal to reach the first duty cycle over a time period, the time period being based, at least in part, on the user input.

Some embodiments of the method further comprise calculating a voltage of the AC motor signal based, at least in part, on the duty cycle of the PWM signal, comparing the voltage of the AC motor signal to a threshold voltage, and in response to the comparison, setting the duty cycle of the PWM signal to be the first duty cycle.

An embodiment of a motor controller can comprise a sensor configured to measure a motor current of the AC motor signal provided from a DC to AC power converter to a three-phase induction motor and a digital signal processor (DSP). A voltage amplitude of the AC motor signal is based, at least in part, on a duty cycle of a pulse width modulated (PWM). The DSP is configured to: receive an indication of the motor current, generate the PWM signal at a first duty cycle; change the duty cycle of the PWM signal until the motor current fluctuates, wherein changing the duty cycle causes a decrease in the voltage amplitude of the AC motor signal; and reverse at least a part of the change in the duty cycle of the PWM signal, thereby stabilizing the motor current at a first level.

In some embodiments, the PWM signal is a sinusoidal pulse width modulated signal.

In some embodiments, the motor current is stabilized at the first level while the motor current does not deviate from the first level beyond a threshold amount.

For purposes of summarizing the disclosure, certain aspects, advantages, and features have been described herein. It is to be understood that not all such aspects, advantages, and features are necessarily achieved in accordance with any particular embodiment. Thus, the various embodiments can be carried out in a manner that achieves or optimizes one or more aspects, advantages, or features as taught herein without necessarily achieving other aspects, advantages, or features as can be taught or suggested herein.

BRIEF DESCRIPTION OF THE DRAWINGS

FIG. 9B is a graph illustrating an AC motor signal voltage and AC motor signal current.

DETAILED DESCRIPTION

Introduction

Figure 1:
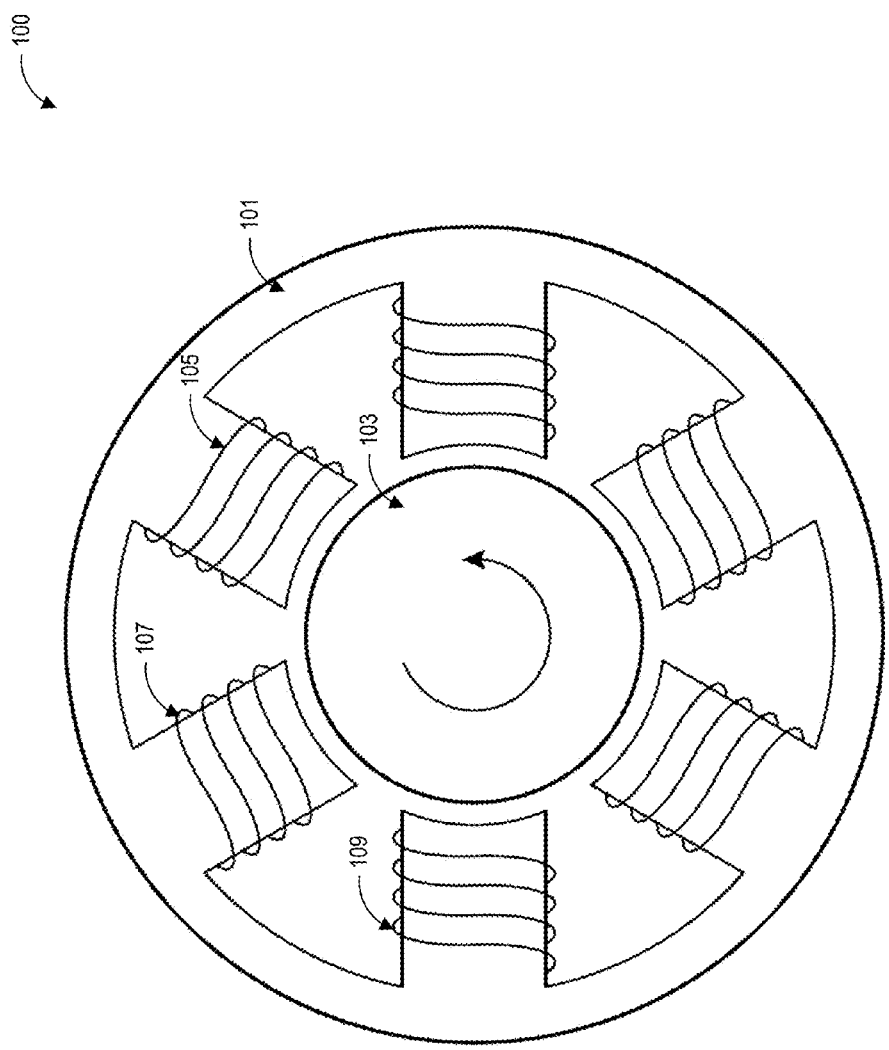
FIG. 1 is a schematic diagram of a three-phase induction motor.
Figure 4:
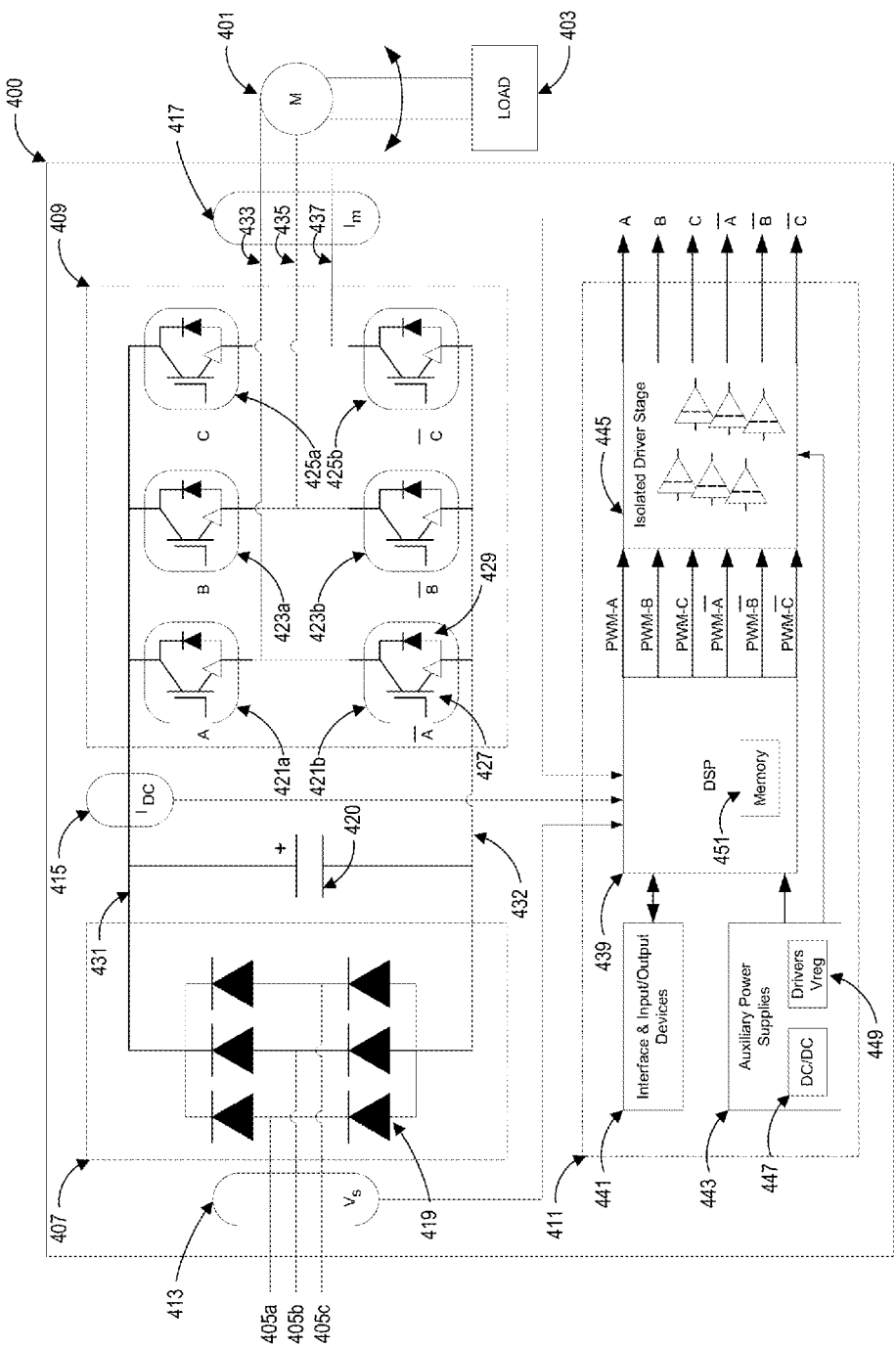
FIG. 4 is a schematic diagram for of an embodiment of a power management system.
Figure 5:
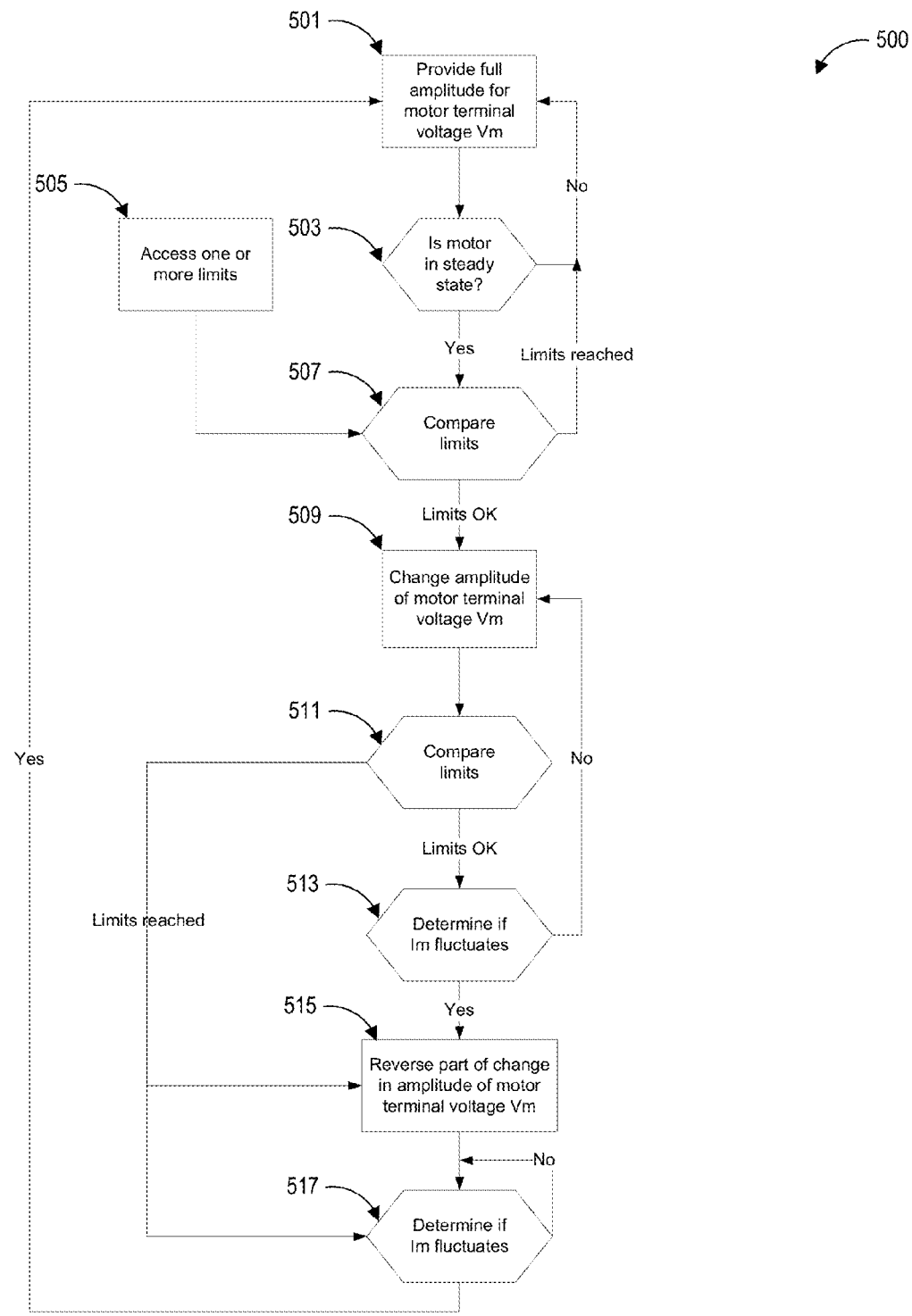
FIG. 5 is a flowchart of an embodiment of a method for providing power to a three-phase induction motor.

A power management system can control a three-phase induction motor in order to more efficiently use the power and provide additional features. The power management system can analyze conditions to control or optimize the settings of the power provided to the motor. An example three-phase induction motor is shown in FIG. 1, an example power management system is shown in FIG. 4, and example methods for controlling the motor are shown in FIG. 4 and FIG. 5.

In some embodiments, a power management system can be used to improve the efficiency of induction motors, such as for example, but without limitation, three-phase induction motors. Three-phase induction motors can have an efficiency that varies with load conditions. Three-phase induction motors can operate more efficiently at greater or full loads and operate less efficiently with a light load or no load. Accordingly, embodiments of a power management system disclosed herein can be configured to make adjustments to improve the efficiency of the motor based on the load requirements of the motor.

In some embodiments, a power management system can reduce the power inefficiently wasted by a motor. The power management system can also reduce the heat generated by the motor. Some motors have parts that degrade over time and degrade faster when operated at higher temperatures. For example, the useful lives of some forms of motor insulation are halved with each 10 degree Celsius increase in operating temperature. Accordingly, by reducing heat, the power management system can prolong the life of motors.

In some embodiments, a power management system can be used to control the speed of the motor, set ramp up and ramp down times for the motor for start up and shut down, provide a soft start option, reduce inrush current, provide overload protection, provide limit protection, adjust to fluctuating loads, adjust functionality according to user-programmable inputs, set the motor to operate with a safety margin away from limits, and reduce operating vibrations. The power management system can report the performance of a motor, record and report current and historical performance of a motor, calculate power savings from efficiency, calculate financial savings from efficiency, calculate carbon dioxide emissions savings from efficiency, etc. In some embodiments, the power management system can generate reports related to the operation and performance of the power management system or motor, such as the frequency, voltages, currents, efficiencies, power, load, PWM signals, speed, etc. In some embodiments, the power management system can provide output through various output devices including wired devices such as display screens, networked devices such as computers, and wirelessly connected devices such as smartphones or tablets. Various embodiments may realize one, various combinations of, or all of the aspects, features, or advantages disclosed herein.

Motor Technology

FIG. 1 shows an example three-phase induction motor 100. The three-phase induction motor 100 includes a stator 101, rotor 103, and windings 105, 107, 109.

The windings 105, 107, 109 are wound around parts of the stator 101. An alternating current ("AC") signal is supplied to each winding 105, 107, and 109. Each AC motor signal supplied to one of the windings 105, 107, 109. Winding 105 is 120 degrees out of phase with winding 107 and 240 degrees out of phase with winding 109. The AC motor signals generate a magnetic field that imparts an electromagnetic force onto the rotor 103, which produces a torque that turns the rotor 103. An AC motor signal provided to a terminal of the motor can have a voltage amplitude, which is referred to as a "motor terminal voltage" $V_m$. The motor terminal voltage $V_m$, as used in the exemplary embodiments herein, refers to a root mean square ("RMS") voltage of an individual AC motor signal. However, the relationships, principles, and teachings relating to individual signals can extend to other individual signals or to a group of signals collectively. Furthermore, RMS characterizations can be converted to other signal characterizations (e.g., peak-to-peak amplitudes), and discussion relating to the other equivalent properties (e.g., amplitudes) will be understood by one of ordinary skill in the art.

The motor 100 can be operated according to one or more and/or a various combination of the relationships and equations discussed below. In addition, a number of realizations relating to the interoperation of the principles and equations, particular manipulations and their effects, hardware implementations, and hardware simplifications are also disclosed. Various embodiments of the power management system can make use of one or more of these principles, equations, and realizations.

The performance of a motor may intrinsically depend on load dynamics. Motors typically operate more efficiently at full load and less efficiently at lower loads. This means that even a highly efficient motor can, depending on the load, operate at low efficiency and low power factor. In practice, most motors are rarely continuously operated at full load, if at all. In addition, to prevent damage from brief or unexpected overloading, many motors are oversized for the typical load to which they will be subjected during operation. Furthermore, sometimes motor manufacturers conservatively inform users of a rated motor load below an actual full load capability of the motor in order to provide a margin of error. Accordingly, many motors operate on less than full load and operate at low efficiency.

The power consumed by a three-phase induction motor can be described by equation 1:

$$P = \sqrt{3} V_m I_m \cos \theta \qquad \text{Eq. 1}$$

where P is the active power of the motor, $V_m$ is the motor terminal voltage, $I_m$ is motor current, $\cos \theta$ is the power factor, and $\theta$ is the phase angle between voltage and current.

To produce enough torque to turn a particular load $L_1$, a motor may require active power $P_1$. Accordingly, a motor may use power $P_1$ to drive a particular load $L_1$ when the motor is provided with an AC motor signal characterized by $V_1$ and $I_1$ and the power factor is $\cos \theta_1$. One might expect that, according to Eq. 1, if the voltage of the AC motor signal were reduced to a lower level $V_0$, then the resulting power would be reduced to a lower level $P_0$. However, this is not necessarily the case; under some conditions, a counterintuitive result can occur. The power $P_1$ can remain constant or at least experience a smaller than proportional reduction compared to the reduction from $V_1$ to $V_0$ because the power factor $\cos \theta_1$ will increase to a higher value $\cos \theta_2$, offsetting the effect of reducing the voltage to $V_0$. Hardware can be provided so that that the power factor $\cos \theta_1$ will increase to a higher value $\cos \theta_2$, and examples are disclosed herein.

Figure 2:
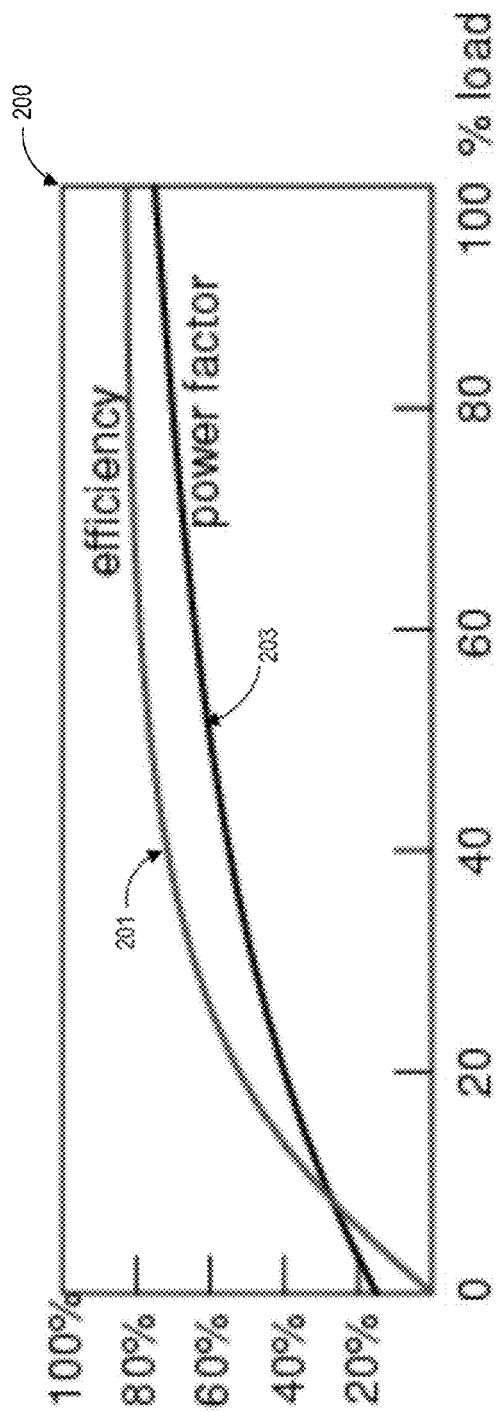
FIG. 2 is a graph of an example relationship between power factor and efficiency

FIG. 2 shows a graph 200 of an example relationship between power factor and efficiency. Efficiency is shown by curve 201. Power factor is shown by curve 203.

Accordingly, it can be seen that for some motors driving less than full load, when the load is increased, the power factor increases along with efficiency. Accordingly, through the combination of Eq. 1 and the graph shown in FIG. 2, it can be determined that, for some conditions, decreasing the voltage of an AC motor signal provided to a motor can cause the efficiency of a motor to increase, and the motor will still provide the amount of power $P_1$ required to drive the load $L_1$.

A motor produces a magnetic flux Φ based on the motor terminal voltage $V_m$ according to equation 2:

$$V_m \approx 4.44 NF\Phi \qquad \text{Eq. 2}$$

where N is the number of turns of winding and F is the frequency of the motor. Accordingly, by controlling the motor terminal voltage $V_m$, the magnetic flux generated within the motor can be controlled. Using a controlled variation of developed magnetic flux, the power of the motor can be controlled to match power demanded by a load.

The motor current $I_m$ in an induction motor is a combination of a real current $I_m \cos \theta$ (which produces torque) and an imaginary current $I_m j \sin \theta$. The total motor current can be represented by equation 3:

$$I_m = I_m(\cos \theta + j \sin \theta) \qquad \text{Eq. 3}$$

Because the real component of the current $I \cos \theta$ is used to produce torque, a power management system can allow a necessary amount of current to be provided to a motor in order to drive a load. Accordingly, in some embodiments, the power management system does not directly control the current. The uncontrolled current provided to the motor can vary based on the demands of the load, the motor power factor $\cos \theta$, and the motor terminal voltage $V_m$.

When an AC motor signal is supplied to a motor and the voltage of the AC motor signal is reduced while the current of the AC motor signal is unregulated, then the efficiency of the motor can be increased up to a certain point without significantly increasing the motor current $I_m$ or without increasing the motor current $I_m$ at all. When the current becomes unstable, the motor may be unable to further increase efficiency and requires more motor current $I_m$ to drive the load. Accordingly, the current can be measured, and the stability of the current can be used to determine when a high efficiency is achieved or when the motor requires increased power.

Accordingly, despite the complex relationships between the load, the motor power, the power provided to the motor, the motor terminal voltage $V_m$, the motor current $I_m$, the motor power factor $\cos \theta$, efficiency, heat, and other variables, the stability of the motor current $I_m$ can be used to determine when improved or maximum efficiency operating conditions are achieved. No external sensors are required to monitor the motor or load. Systems and methods can improve the operating efficiency of a motor without performing complex calculations between the many relationships. The motor current $I_m$ can be measured and monitored for stability and changes as one or more other variables (e.g. motor terminal voltage $V_m$) are adjusted to improve efficiency. Furthermore, this can be used to detect the improved or optimum efficiency without under powering the motor. At all times, the motor can provide enough torque as required by the load.

Figure 3:
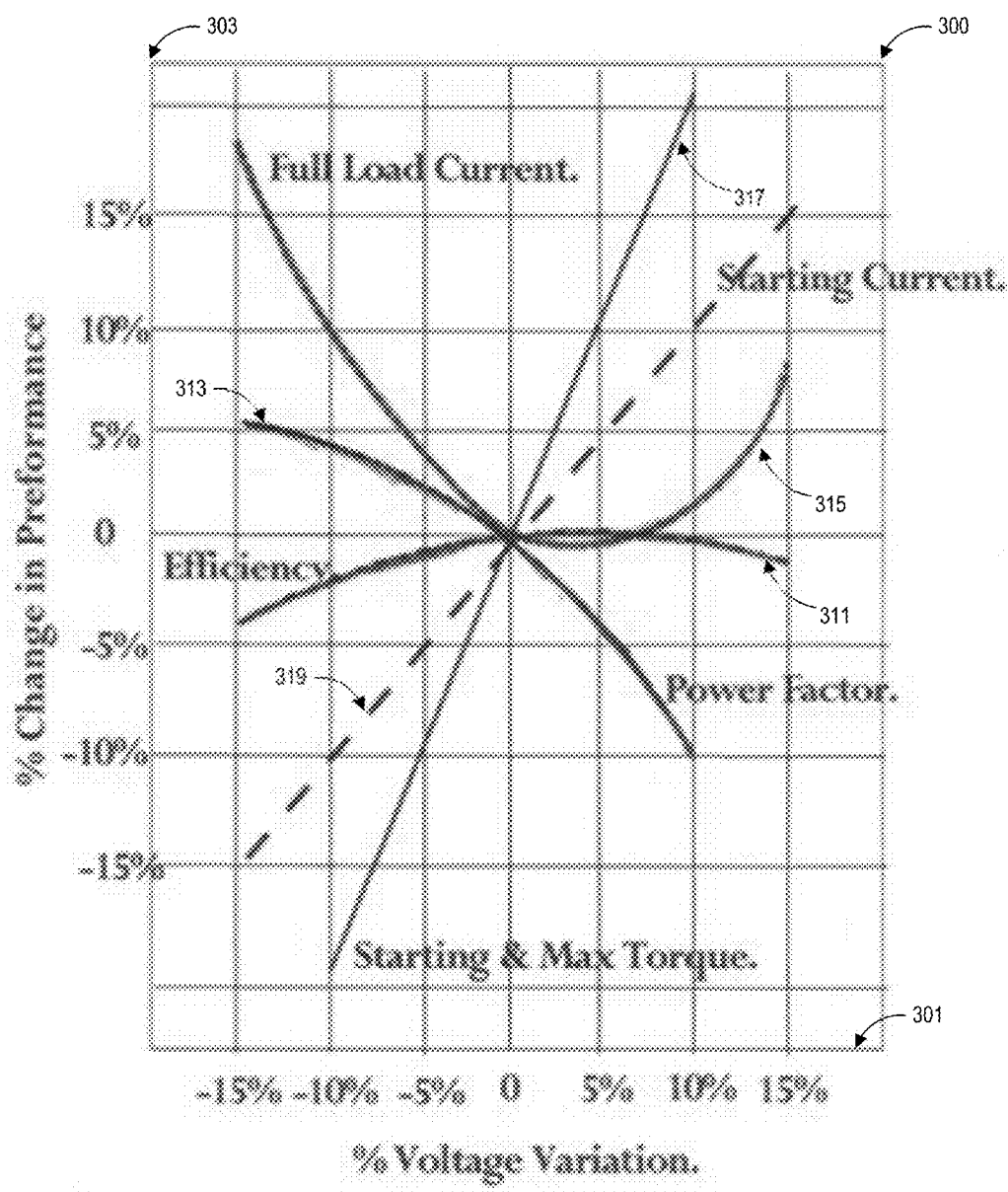
FIG. 3 is a graph showing various effects of motor terminal voltage variation on several variables.

FIG. 3 shows a graph 300 of the effects of motor terminal voltage variation on several variables. The x-axis 301 shows a percent change in the motor terminal voltage. The y-axis 303 shows a percent change of a corresponding variable.

Efficiency is represented by curve 311. Power factor is represented by curve 313. Full load current is represented by curve 315. Starting and max torque is represented by curve 317. Starting current is represented by curve 319.

As shown in the graph 300, a reduction in the motor voltage (at least within a range of values) increases motor power factor. In accordance with Eq. 3, this reduces the magnetizing component ($\sin \theta$) of $I_m$ while the real component ($\cos \theta$) of $I_m$ is constant as it is determined/required by the load for torque.

Accordingly, in some embodiments, the power management system can control a duty cycle of a PWM signal that is used to control the motor terminal voltage $V_m$ and frequency of an AC motor signal. The carrier frequency and DC voltage properties of the PWM signal can be held constant. An energy saving algorithm can be based on voltage-frequency control, and the motor can develop maximum torque throughout the speed-torque range. The efficiency of a motor can be adjusted while maintaining the torque demanded by the load.

Some embodiments described herein relate to the management of an AC-DC-AC power supply configured to supply power to a three-phase induction motor and are based on one or more of the disclosed relationships and equations. Some of the relationships and equations described herein are not applicable to other types of power systems (e.g., AC-AC power systems) or other types of motors (e.g., 2 phase motors, communicator motors, combustion motors). Accordingly, technology related to these other types of power systems or other types of motors do not inform some of the relationships, equations, and related technology disclosed herein, and one of ordinary skill in the art would not have looked to the other types of power systems or the other types of motors for some of the relationships, equations, or related technology disclosed herein. For example, a three-phase AC to AC converter may use 6 thyristors to control voltage amplitudes by varying the firing angles via a firing circuit. Accordingly, the speed/torque characteristics of AC-AC converters are not constant. Thus, motors powered by AC-AC converters only produce a rated torque at a rated speed. This can limit AC-AC converters to fewer applications.

Hardware

FIG. 4 shows an example hardware diagram for a power management system 400. The power management system 400 receives an AC power signal over inputs 405a, 405b, 405c and provides a AC motor power signal to a three-phase induction motor 401 (for example, motor 100 of FIG. 1) configured to turn a load 403.

The power management system includes an AC to DC rectifier 407, an DC to AC inverter 409, control circuit 411, an input voltage sensor 413 to sense an input voltage ($V_s$), a current sensor 415 to sense a DC current ($I_{DC}$), a current sensor 417 to sense a motor current ($I_m$), a capacitor bank 420, a DC power signal line 431, ground line 432, and AC motor signals lines 433, 435, 437.

The AC to DC rectifier 407 includes a plurality of diodes 419. The DC to AC inverter 409 includes a plurality of inverter units 421a, 421b, 423a, 423b, 425a, 425b that each includes a switch 427 and a diode 429. The control circuit 411 includes one or more digital signal processors ("DSP") 439, interface and input/output ("I/O") devices 441, auxiliary power supplies 443, and an isolated driver stage 445. The auxiliary power supply 443 includes a DC/DC power supply 447 and drivers and voltage regulators 449. The control circuit also includes memory 451.

The power management system 400 can receive AC input signals through inputs 405 and convert the AC input signals using the AC to DC rectifier 407 into a DC power signal on the DC power signal line 431. The DC to AC inverter 409 receives the DC power signal and generates three AC motor signals (one on each of AC motor signal lines 433, 435, and 437) where the phases and voltages of the AC motor signals are based on PWM signals. The PWM signals (PWM-A, PWM-B, PWM-C, and their complements) are the carrier signals generated by the DSP. The DSP can control the phase of the PWM signals to be 120 degrees apart so that the AC motor signals provided to the motor 401 will also be 120 degrees apart. Based on inputs from the sensors 413, 415, and 417, the DSP can change the duty cycles of the PWM signals to affect the voltages of the AC motor signals (the PWM output signals). The duty cycle can be determined, for example, according to the methods shown in FIG. 5 or FIG. 6. Accordingly, the power management system 400 can control the motor terminal voltages $V_m$ of the AC motor signals provided to terminals of the motor 401 to affect the efficiency of the motor 401 and provide other functionality. The PWM signals can be individually controlled. In some embodiments, the duty cycles of the PWM signals are controlled together (e.g., reduced or increased together) so that the three motor terminal voltages $V_m$ are also reduced or increased together.

The AC to DC rectifier 407 is configured with 6 diodes to receive AC power over inputs 405a, 405b, and 405c and output the DC power signal over DC power signal line 431. In some embodiments, the DC power signal can have a steady or fixed voltage. Each input 405a, 405b, and 405c is coupled between a respective pair of diodes. Accordingly, the power management system 400 can receive an uncontrolled AC input (e.g., from an input power source such as a power outlet, power supply, power generator, etc.) that varies in one or more characteristics (e.g., current, voltage). For example, in some embodiments, the power management system receives an input of 380-400V that varies +/−10% and draws a variable amount of current from an input power source. In some embodiments, the power management system receives an input voltage of 525V that varies +/−10% and draws a variable amount of current from the input power source. In some embodiments, the power management system receives an AC input signal from 110V to 250V with a frequency between 50-60 Hz and draws a variable amount of current. Some embodiments can include various other input voltage, frequency, and current ranges. Although FIG. 4 shows an AC to DC rectifier 407 configured to receive three-phase input power, in some embodiments, the AC to DC rectifier can be configured to receive inputs of different phases (e.g., a single phase).

The DC to AC inverter 409 receives the DC power signal over DC power line 431 and generates three AC motor signals over AC motor signal lines 433, 435, and 437, which are provided to power the motor 401. The respective inverter unit pairs 421a and 421b ("421"), 423a and 423b ("423"), 425a and 425b ("425") are used to generate the respective AC motor signals over the respective AC motor signal lines 433, 435, and 437. Each of the inverter units 421a, 421b, 423a, 423b, 425a, 425b includes an arrangement of a switch 427 and diode 429. The switch 427 can be, for example, an insulated gate bipolar transistor ("IGBT") or other type of switch. Each respective inverter unit pair 421, 423, 425 also receives a respective PWM signal (A, B, or C) and its complement. The duty cycle of a PWM signal can be used to control the voltage of the respective AC motor signal. Increasing the duty cycle of a PWM signal can increase the motor terminal voltage $V_m$ of the AC motor signal, and decreasing the duty cycle of a PWM signal can decrease the motor terminal voltage $V_m$ of the AC motor signal. The phase of the PWM signal also affects the phase of the AC motor signal. Accordingly, the three PWM signals A, B, and C can be generated out of phase (e.g., by 120 degrees) so that the AC motor signals are also out of phase (e.g., by 120 degrees). The frequency of the PWM signal affects the voltage and frequency of the AC motor signal. The frequency of the PWM signals can be held constant while the motor terminal voltage $V_m$ is adjusted. Accordingly, the duty cycles of a PWM signal can be adjusted so that the motor terminal voltage $V_m$ is adjusted for efficiency.

In some embodiments, the motor terminal voltage $V_m$ can be adjusted by adjusting the DC power signal on the DC power signal line 431. The AC to DC rectifier 407 can be controlled by the PWM to adjust the DC power signal.

Sensor 413 detects the voltages of the AC input signals provided through inputs 405a, 405b, 405c and provides an indication of the detected voltages to the DSP 439. Sensor 415 detects the current of the DC power signal provided on the DC power signal line 431 and provides an indication of the detected current to the DSP 439. The DSP 439 can use the detected current and voltage to provide overcurrent protection and overvoltage protection. The DSP 439 can also use the detected current and voltage to provide shutdown, isolation, current reduction, or power reduction functions upon detecting the overcurrent/overvoltage conditions. Sensor 417 detects the currents of the AC motor signals provided on the AC motor signal lines 433, 435, 437 and provides an indication of the detected currents to the DSP 439. The sensors can be internal to the power management system 400. In some embodiments, no external sensors and no external feedback signals are required to be added from the motor or the load back to the power management system 400. In some embodiments, the sensors 413, 415, 417 can measure the respective voltages or currents and provide a measurement to the DSP 439, for example, as a digital signal. In some embodiments, the sensors 413, 415, 417 can provide representative analog signals (e.g., voltages) to the DSP 439 where the representative analog signals reflect the values of the respective detected voltage or currents, and the DSP 439 can process the analog signals (e.g., with an analog to digital converter). In some embodiments, one or more sensors 413, 415, 417 can be included on the same circuit board as the AC to DC rectifier 407, the DC to AC inverter 409, and/or the control circuit 411.

The control circuit 411 includes a DSP 439 that receives the outputs from the sensors 413, 415, 417. From the interface and I/O devices 441, the DSP 439 can also receive inputs such as a selection of a soft start option, a ramp up time, a profile selection, motor rated current limits (e.g., $I_{rm}$), motor rated power limits, motor rated voltage limits (e.g., $V_{rm}$), motor rated efficiency limits cos $\theta_{rm}$, power management circuit input type, control settings such as those shown in FIG. 10, and other options. The I/O devices can include, for example, a keyboard, touchpad, speakers, mouse, stylus, monitor, and other types of I/O devices. Furthermore, the control circuit 411 can be configured to receive input from and send output to other types of devices over a connected or wireless interface, such as a computer, laptop, smartphone, tablet, server, database, or other device over a wired connection, Wi-Fi connection, network, internet connection, local connection, or other type of connection. The inputs from the sensors 413, 415, 417 and from the interface and I/O devices 441 can be stored in memory 451 to be used by the DSP to generate reports and for power management functions. In various embodiments, memory 451 can be part of the DSP 439 (e.g., as registers, cache memory, volatile or nonvolatile memory) and/or separate from the DSP 439 (e.g., as a hard drive, solid state drive, or random access memory).

The DSP 439 outputs PWM carrier signals shown as PWM-A, PWM-B, PWM-C, and their complements. The DSP 439 can use the inputs, whether previously stored in memory or provided in real time (e.g., from real time sensors) to adjust one or more properties of the PWM signals. In some embodiments, the DC to AC inverter 409 uses generates sinusoidal AC motor signals based on the PWM signals using a sinusoidal PWM ("SPWM") technique. In some embodiments, the PWM signals can be other types of PWM signals with different shapes and based on other types of functions, and the affected hardware can vary accordingly. Although FIG. 4 shows that the DSP generates six PWM signals, in some embodiments, the DSP generates three PWM signals (A, B, and C), and other circuitry can be added or reconfigured to provide the effect of the complementary signals. The PWM signals are coupled through an isolated drive stage 445 to the DC to AC inverter 409. Examples of isolated driver stages include single IGBT driver integrated circuits and gate drive optocouplers. The isolated driver stage provides power isolation between the DSP 439 and the DC to AC inverter 409. One or more auxiliary power supplies such as DC to DC converters 447 and drivers/voltage regulators 449 can be used to supply power to the DSP 439 and the isolated driver stage 445.

Digital Signal Processor Operation

Figure 6:
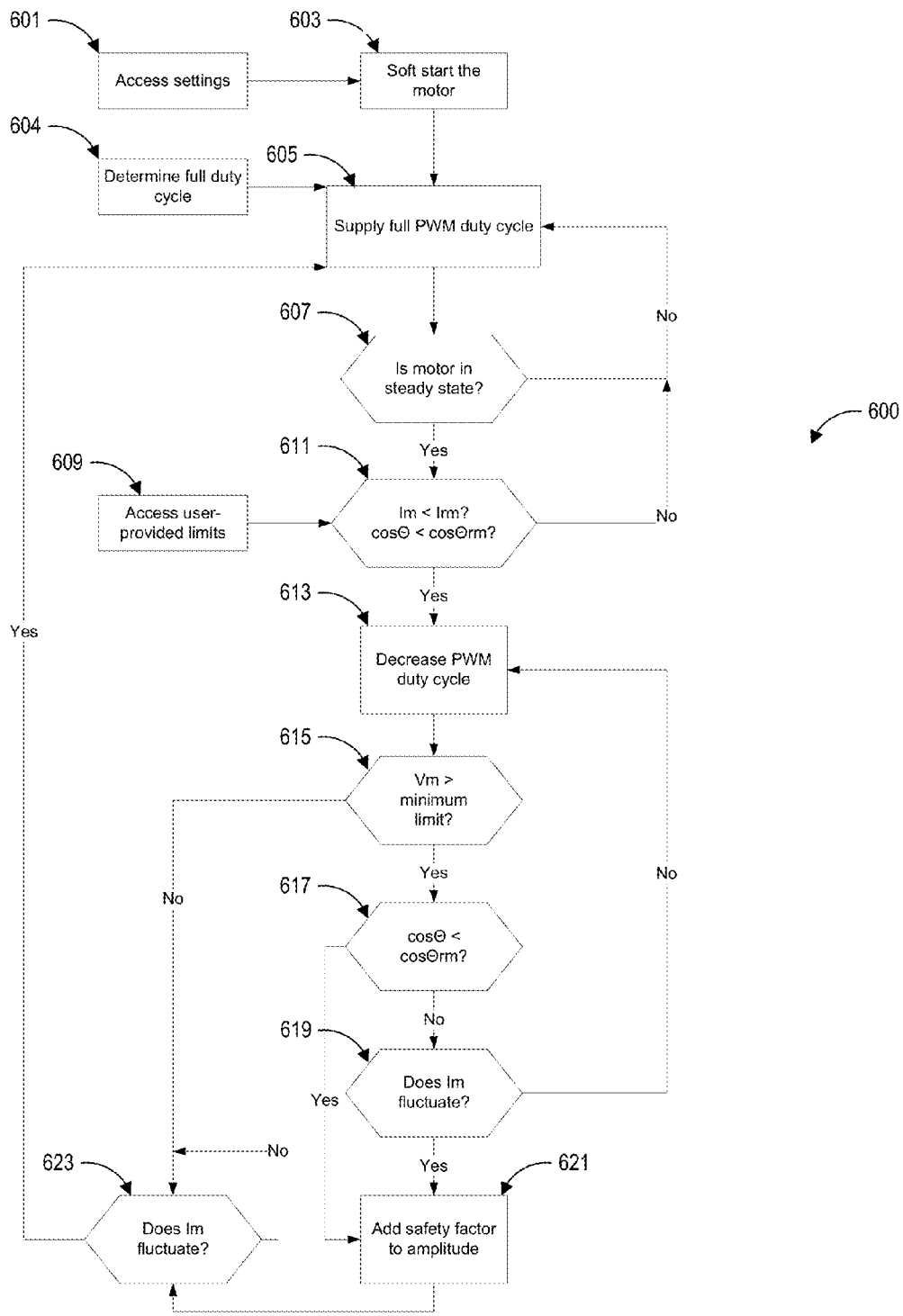
FIG. 6 is a flowchart of another embodiment of a method for providing power to a three-phase induction motor.

With continued reference to FIG. 4, the DSP 439 can change properties of the PWM signals in order to control properties of the AC motor signals provided to the terminals of the motor 401 (for example, as shown in FIG. 5 and FIG. 6). The DSP 439 can continuously receive real-time signals from the sensors 413, 415, 417 and access inputs from memory such as $V_{rm}$, $I_{rm}$, cos $\theta_{rm}$, soft start options, a maximum speed, a rated speed, etc.

Initially, when power is turned on, the DSP 439 waits for initialization, and the motor speed is then ramped up according to a selected acceleration time. Accordingly, the DSP 439 can control the power management system 400 such that the power, voltage, and/or current drawn and/or output are gradually increased over a period of time (e.g., 1-10 seconds). The period of time can be received as user input and stored in the memory 451. By providing for a soft start option, the inrush current can be controlled and reduced comparted to starting at full power/voltage/current. This can be performed, for example, by increasing the frequency and voltage supplied to the motor 401 over a programmable period of time while holding the voltage-frequency ratio of the AC motor signal constant. During the soft start period of time, the acceleration of motor speed can be controlled to increase from zero/standstill to a maximum or rated speed.

The DSP 439 can provide full power to the motor 401. This can occur in response to setting the duty cycle of the PWM signals to be a full duty cycle (e.g., always on) so that the motor terminal voltage of the AC motor signal provided to the motor has full voltage amplitude (e.g., 100% amplitude, a user-set maximum amplitude). The full duty cycle can be 100%, a maximum amount that the hardware is capable of providing, a default value (e.g., 85%), a designed duty cycle (e.g., hardware maximum minus a safety factor), a user-set motor rated parameter, etc. The full voltage amplitude can be a maximum voltage amplitude that the hardware is capable of providing, a default voltage amplitude, a designed voltage amplitude (e.g., hardware voltage maximum minus a safety margin), a user-set maximum voltage amplitude limit, etc. Based on the sensors signals, the DSP 439 can determine when the motor 401 reaches a steady state condition (e.g., when the motor current $I_m$ stabilizes) and the motor 401 is being provided with sufficient power for the load 403.

Once the motor 401 reaches steady state condition, the DSP 439 can check that the motor current $I_m$ is less than a motor rated current $I_{rm}$. A user can provide the motor rated current $I_{rm}$ based on specifications for the motor 401 coupled to the power management system 400. In accordance with the relationships described above, the motor current $I_m$ can increase when adjustments are made to a PWM signal to decrease the motor terminal voltage. Accordingly, the motor current $I_m$ can be checked against the motor rated current $I_{rm}$ to ensure that there is room for adjustment.

The DSP 439 can also check that the motor power factor $\cos\theta$ is less than a motor rated power factor $\cos\theta_{rm}$. A user can provide the motor rated power factor $\cos\theta_{rm}$ based on specifications for the motor 401 that is coupled to the power management system 400. In accordance with the relationships described above, the motor power factor $\cos\theta$ can increase when adjustments are made to the PWM signal to decrease the motor terminal voltage $V_m$. However, if the motor 401 is already at its rated efficiency limit, then adjusting the PWM signal may be ineffective at further raising the efficiency; instead, the motor 401 may draw more current and operate at a same or lower efficiency. Accordingly, the motor power factor $\cos\theta$ can be checked against the motor rated power factor $\cos\theta_{rm}$ to ensure that there is room for adjustment. The motor power factor $\cos\theta$ can be determined based on the motor current $I_m$ (measured from sensor 417) and the motor terminal voltage $V_m$ (controlled based on a duty cycle set by the DSP 439). The phase angle ($\theta$) between $I_m$ and $V_m$ can be calculated, and then the power factor ($\cos\theta$) can be calculated. The motor can be allowed to reach steady state condition and the motor current $I_m$ and motor power factor $\cos\theta$ are checked against the respective limits.

The duty cycle of the PWM signal can be continuously and/or iteratively changed or reduced to decrease the amplitude of the motor terminal voltage $V_m$ until a limit condition is met. The DC voltage and carrier frequency of the PWM signals can be held constant. Limit conditions can include:

The motor current $I_m$ reaches the motor rated current $I_{rm}$;

The motor current $I_m$ reaches the load torque demand (TL);

The motor power factor $\cos\theta$ reaches the motor rated power factor $\cos\theta_{rm}$;

The motor terminal voltage $V_m$ reaches a minimum motor terminal voltage limit; or $I_m$ becomes unstable.

The load torque demand TL is known based on an analysis of the motor current $I_m$. The motor current $I_m$ can reach the load torque demand (TL) at the point where the amplitude of the load torque demand is decreasing, there is positive displacement measured in the motor current $I_m$, and the operating power factor $\cos\theta$ has reached the motor rated power factor $\cos\theta_{rm}$.

The motor terminal voltage $V_m$ can be calculated based, at least in part, on the duty cycle of the PWM signals generated by the DSP 439. In some embodiments, the motor terminal voltage $V_m$ is calculated based on a proportional relationship to a duty cycle. In some embodiments, the calculation can be performed with reference to a look-up table stored in the memory 451, where the look up date includes data indicating the motor terminal voltage $V_m$ for a range of duty cycles. In some embodiments, other variables affecting the motor terminal voltage $V_m$ can be sensed and used to calculate the motor terminal voltage $V_m$. The motor power factor $\cos\theta$ can be calculated by taking the cosine of the angle between the motor terminal voltage $V_m$ and the motor current $I_m$. The motor current can become unstable when the motor current $I_m$ deviates compared to an expected or previously measured motor current. In some embodiments, the DSP 439 will calculate when the motor current $I_m$ fluctuates more than 5% to determine stability. In some embodiments, an RMS motor current is compared to a previously measured RMS motor current. In some embodiments, an instantaneous current can be measured against an expected or calculated value (e.g., compared to a number, compared to a trig function, compared to a function that calculates the expected motor current based on the power factor $\cos\theta$ and motor terminal voltage $V_m$). In some embodiments, the rate of change in the current (e.g., per unit of time, per change in motor terminal voltage $V_m$) can be compared to an expected rate of change in the current. The instability in the motor current can precede a failure of the motor to power the load, and the power management system 400 can respond to an instability of the current before the motor becomes unable to power the load.

When a limit condition is reached, the DSP 439 can determine that a limit for the duty cycle and/or a limit for the motor terminal voltage $V_m$ is reached. The limit for the duty cycle can be a minimum limit, and the limit for the motor terminal voltage $V_m$ can be a minimum limit. Accordingly, the efficiency of the motor can be increased. The PWM signal duty cycle, motor terminal voltage $V_m$, motor current, power factor $\cos\theta_{rm}$, efficiency, and other variables related to the power management settings used to obtain the increased efficiency can be stored in a memory for reporting or for use in later calculations and comparisons. In some embodiments, after the duty cycle of the PWM signal has been reduced to decrease the motor terminal voltage $V_m$, the duty cycle of the PWM signal can be increased by a safety margin to increase the motor terminal voltage $V_m$ to allow fluctuations/changes in load conditions, provide hysteresis, and/or provide stall prevention. In some embodiments where the duty cycle of the PWM signal is changed to cause a change in the motor terminal voltage $V_m$, the changes in the duty cycle and the changes in the motor terminal voltage $V_m$ can be partially reversed. Accordingly, the motor 401 can operate away from its limits and be protected from sudden load changes.

The power management system 400 can monitor the motor current $I_m$. In some scenarios, the load driven by the motor may change after the power management system 400 has adjusted the duty cycle of the PWM signals, reduced the motor terminal voltage $V_m$, and improved the operating efficiency of the motor 401. In some embodiments, if the load increases, decreases, or changes at all, the power management system 400 can resume providing the full duty cycle to cause the full motor terminal voltage $V_m$ to be provided to the terminals of the motor 401. In some embodiments, if the load decreases, then the power management system 400 can resume adjusting the duty cycle of the PWM signals to reduce the motor terminal voltage $V_m$ until new limits are met. Changes in the load can be detected by checking the stability of the motor current $I_m$. If the load 403 increases while the duty cycle of the PWM signals are controlled so that the motor terminal voltage $V_m$ is held constant, then the motor current $I_m$ might increase so that more power is provided to the motor 401. Accordingly, in response to detecting an increase in $I_m$ beyond a threshold limit that can account for minor fluctuations, the power management system can resume providing the full duty cycle to achieve the full motor terminal voltage $V_m$.

The power management system 400 can monitor the input voltage $V_s$ using input voltage sensor 413. The input voltage $V_s$ measured by the sensor can used to provide overvoltage and undervoltage protection. The DSP 439 or other circuitry can compare the input voltage $V_s$ to threshold maximum and minimum values or to expected maximum and minimum values (e.g., under or over by 10% compared to a rated input voltage $V_s$). If the input voltage $V_s$ is greater than the rated motor voltage, then the power management system 400 can regulate the power to provide the AC motor signals at a rated value. The DSP can analyze the input voltage $V_s$ for unbalanced phases (e.g., for differences exceeding 5%) to provide protection or regulation.

Example Methods

FIG. 5 shows a flowchart of an example method 500 for providing power to a three-phase induction motor. The method 500 can be used to improve the efficiency of a motor, save energy, and perform a number of other functions described herein.

At block 501, the full amplitude of the motor terminal voltage $V_m$ can be provided. The full amplitude can be a maximum voltage amplitude that the hardware is capable of providing, a default voltage amplitude, a designed voltage amplitude (e.g., hardware voltage maximum minus a safety margin), a user-set maximum voltage amplitude limit, etc. The amplitude of the motor terminal voltage $V_m$ can be controlled by adjusting the duty cycle of the PWM signal to be a full duty cycle. The amplitude of the motor terminal voltage $V_m$ can be controlled by adjusting a DC voltage.

At block 503, it can be determined if the motor has reached steady state. The steady state can be determined based on the stability of the motor current $I_m$. If a steady state condition is not yet reached, then the method can proceed to block 501 and loop until stead state condition is reached. Accordingly, the full amplitude of the motor terminal voltage $V_m$ can be provided to the motor until the motor reaches a steady state.

At block 505, one or more limits can be accessed. The limits can be provided by a user through one or more I/O devices. The limits can be stored in a memory. Limits can include, for example, a motor rated current $I_{rm}$, a motor rated power factor $\cos \theta_{rm}$, a minimum motor terminal voltage limit, etc. The limits can be set as numbers, set based on a user's selection of a motor or efficiency profile, set based on a lookup table for specifications of a selected motor model, etc. This can be used, for example, to ensure that the motor is operating and/or will be operating within rated limits such as the motor rated current $I_{rm}$.

At block 507, one or more limits can be checked against operating values. For example, the motor current $I_m$ can be compared against the motor rated current $I_{rm}$. As another example, a motor power factor $\cos \theta$ can be compared to a motor rated power factor $\cos \theta_{rm}$. The comparisons can be made to determine if an operating value is less than, less than or equal to, equal to, greater than or equal to, or greater than a limit, depending on the embodiment and limit type being compared. In some embodiments, the limit includes a threshold difference from a user-provided input. In response to the comparison, if the limit is reached or violated, then the method can proceed to block 501. In response to the comparison, if the limit condition is satisfied, the method can proceed to block 509.

At block 509, the amplitude of the motor terminal voltage $V_m$ can be changed. This can be, for example, a change that reduces the amplitude of the motor terminal voltage by decreasing a duty cycle of the PWM signal provided to the DC to AC inverter 409. In conjunction with one or more other blocks, the amplitude of the motor terminal voltage $V_m$ can be reduced iteratively or continuously. For example, blocks 509, 511, and 513 can be simultaneously performed in parallel to create a feedback loop. As another example, blocks 509, 511, and 513 can be performed sequentially in iterations. In various embodiments, various blocks can be performed in combination or in parallel.

At block 511, one or more limits can be checked against operating values. For example, the motor terminal voltage $V_m$ can be compared to a minimum motor terminal voltage limit. As another example, the motor power factor $\cos \theta$ can be calculated and compared to the motor rated power factor $\cos \theta_{rm}$. The comparisons can be made to determine if an operating value is less than, less than or equal to, equal to, greater than or equal to, or greater than a limit, depending on the embodiment and limit type being compared. In some embodiments, the limit includes a threshold difference from a user-provided input. In response to the comparison, if the limit is reached or violated, then the method can proceed to block 515 or 517. In response to the comparison, if the limit condition is satisfied, the method can proceed to block 513.

At block 513, it can be determined if the motor current $I_m$ fluctuates. This can be caused, for example, when the motor terminal voltage is reduced too low such that further reductions in the motor terminal voltage cause increased current to be drawn by the motor to generate enough power to turn the load. The motor current $I_m$ can also fluctuate in response to changes in the load. $I_m$ can be tracked and stored in the memory (e.g., for reporting, for historical comparisons, to determine a rate of change). The motor current $I_m$ can be measured by a sensor and provided to the DSP. The fluctuations or changes in the motor current $I_m$ can be detected to determine if a threshold change in $I_m$ is achieved. In some embodiments, a threshold change can be determined by comparing a present motor current $I_m$ against a baseline motor current that was measured while the motor was in steady state (e.g., at block 503 to before the motor terminal voltage was reduced in block 509). The motor current $I_m$ can be considered unstable when the threshold is exceeded. In some embodiments, the fluctuation in the motor current $I_m$ is measured as a rate of change (e.g., change in $I_m$ per second, change in $I_m$ per motor terminal voltage change, change in $I_m$ per duty cycle change) and considered unstable if the rate is exceeded. If the motor current $I_m$ remains stable, then the motor terminal voltage can continue to be reduced at block 509. If the motor current $I_m$ fluctuates, then the method can proceed to block 515. In some embodiments, if the motor rated current $I_m$ fluctuates, then the method can proceed (not illustrated) to block 517.

At block 515, part of the change in the amplitude of the motor terminal voltage $V_m$ can be reversed. This can include changing the amplitude of the motor terminal voltage to provide a safety factor (e.g., a percentage or numerical increase) or buffer for hysteresis. For example, if the motor terminal voltage $V_m$ was reduced at block 509 (including feedback loops) by a first amount, then at block 515, the motor terminal $V_m$ voltage can be increased at block 515 by a second amount that is smaller than the first amount. The change can be implemented, for example, by changing the duty cycle of the PWM signal. This can prevent the motor from operating at one or more operating limits.

At block 517, it can be determined if the motor current $I_m$ fluctuates. This can be caused, for example, in response to changes in the load. For example, increases the load increases can cause the motor terminal current $I_m$ to increase. Minor fluctuations in the load can be ignored, for example, when the motor operates with a safety margin or buffer capacity to accommodate minor fluctuations in the load. The motor current $I_m$ can be tracked and stored in the memory (e.g., for reporting, for historical comparisons, to determine a rate of change). The motor current $I_m$ can be measured by a sensor and provided to the DSP. The fluctuations or changes in $I_m$ can be detected to determine if a threshold change in $I_m$ is achieved. In some embodiments, a threshold change can be determined by comparing a present motor terminal current $I_m$ against a baseline motor current that was measured when the maximum change in the amplitude of the motor terminal voltage was reached (e.g., at blocks 509, 511, or 513) or when part of the change was reversed (e.g., at block 515). In some embodiments, the fluctuation in the motor current $I_m$ is measured as a rate of change. If the motor current $I_m$ remains stable, then the method can loop to block 517 such that the motor terminal voltage can continue to be maintained at an efficient value until the motor current becomes unstable and fluctuates. If the motor current $I_m$ fluctuates, then the method can proceed to block 501 and provide full amplitude to the motor terminal voltage $V_m$, for example, so that the motor has maximum power to drive a newly changed load. The power management system can respond to an instability in the motor current $I_m$ before the motor is unable to drive the load (e.g., before the rotation speed is reduced, before insufficient torque is supplied).

FIG. 6 shows a flowchart of the energy saving algorithm used 600 for efficiently providing power to a three-phase induction motor. The method 600 can be used to improve the efficiency of a motor, save energy, and perform a number of other functions described herein.

At block 601, one or more settings can be accessed. The settings can include user inputs, initialization options, acceleration times, motor frequencies, and motor speeds.

At block 603, the motor can be soft started over a selected time period. This can be performed, for example, by increasing the frequency and voltage supplied to a motor over a period of time (e.g., an acceleration time of several seconds) while holding the voltage-frequency ratio of the AC motor signal constant. This can include gradually increasing the power, current, or voltage provided to the motor. Soft starting the motor can minimize inrush current.

At block 604, the full PWM duty cycle is determined. This can be provided by a user. In some embodiments, a full voltage amplitude is provided by a user, for example, by setting a value (e.g., 500V) or by selecting a profile (e.g., low power, high power) that corresponds to a respective full amplitude setting (e.g., 400V for low; 600V for high). Accordingly, based on the full voltage amplitude, the corresponding full PWM duty cycle can be calculated, looked up, or otherwise determined.

At block 605, the full PWM duty cycle can be provided. A DSP can provide a PWM carrier signal with the full duty cycle. The PWM signal can be provided to switches (such as IGBT's) in an inverter to generate an AC motor signal according to a PWM technique such as SPWM. The AC motor signal can have a motor terminal voltage based, at least in part, on the duty cycle of the PWM signal.

At block 607, it can be determined if the motor has reached steady state. The power management system can determine that the motor reaches steady state, for example, by sensing that the motor current $I_m$ stabilizes (e.g., remains within a threshold range). If steady state condition is not yet reached, then the method can proceed to block 605 and loop until the steady state condition is reached. Accordingly, the full duty cycle of the PWM signal can be provided to the motor until the motor reaches steady state.

At block 609, one or more user-provided limits can be accessed. The limits can be provided by a user through one or more I/O devices and stored in a memory. The limits can include a motor rated current $I_{rm}$, a motor rated power factor $\cos\theta_{rm}$, and a minimum motor terminal voltage limit. The limits can be set as numbers, set based on a user's selection of a motor or efficiency profile, set based on a lookup table for specifications of a selected motor model, etc. These limits can be used, for example, to ensure that the motor is operating and/or will be operating within rated limits such as the motor rated current $I_{rm}$.

At block 611, the motor current $I_m$ is compared against the motor rated current $I_{rm}$, and the motor power factor $\cos\theta$ is compared to a motor rated power factor $\cos\theta_{rm}$. The comparisons can be made to determine if operating conditions are within set limits. In some embodiments, the limit includes a threshold difference from a user-provided input. The results of the comparisons can be determined. In response to the determination, the method can proceed to block 605 if either one of the limits are reached or exceeded. In response to the determination, if the system is operating within the limits, then the method can proceed to block 613.

At block 613, the duty cycle of the PWM signal provided to the DC to AC inverter is reduced. This causes the amplitude of the motor terminal voltage $V_m$ to also be reduced. In conjunction with blocks 615, 617, and 619, the amplitude of the motor terminal voltage $V_m$ can be reduced iteratively or continuously as part of a loop, in parallel, or sequentially.

At block 615, the motor terminal voltage $V_m$ can be compared to the minimum motor terminal voltage limit. The motor terminal voltage $V_m$ can be calculated based, at least in part, on the duty cycle of the PWM signal. Based on the determination of whether or not the motor terminal voltage is greater than the lower limit, the method can proceed to block 617 or 623 as indicated.

At block 617, the motor power factor cos θ can be compared to the motor rated power factor cos $θ_{rm}$. The motor power factor cos θ can be calculated, based at least in part, on the motor terminal voltage $V_m$ and the measured current $I_m$. Based on the determination of whether or not the motor power factor cos θ is less than the motor rated power factor cos $θ_{rm}$, the method can proceed to block 619 or 621 as indicated.

At block 619, it can be determined if the motor current $I_m$ fluctuates. This can be caused, for example, when the motor terminal voltage is reduced too low such that further reductions in the motor terminal voltage cause increased current to be drawn by the motor to draw enough power to turn the load. The motor current $I_m$ can also fluctuate in response to changes in the load. $I_m$ can be tracked and stored in the memory (e.g., for reporting, for historical comparisons to determine a rate of change). The motor current $I_m$ can be measured by a sensor and provided to the DSP. The fluctuations or changes in the motor current $I_m$ can be detected to determine if a threshold change in $I_m$ is achieved. In some embodiments, a threshold change can be determined by comparing a present motor current $I_m$ against a baseline motor current that was measured while the motor was in steady state (e.g., at block 605 to before the PWM duty cycle was reduced in block 613). In some embodiments, the fluctuation in the motor current $I_m$ is measured as a rate of change. If the motor current $I_m$ remains stable, then the PWM duty cycle can continue to be reduced at block 613. If the motor current $I_m$ fluctuates, then the method can proceed through block 621 to block 623. At block 619, a change in the motor current can be compared to a first threshold change amount (e.g., within 1%, 3%, 5%, 10% of a previous RMS current value, within a threshold range compared to an expected current value; a change in the motor current $I_m$ per decreased PWM duty cycle that is greater than a threshold change in motor current per decreased PWM duty cycle). In some embodiments, if the motor rated current $I_m$ fluctuates beyond a second threshold change amount (e.g., 15% or 20%) that is greater than the first amount, then the method can proceed from block 619 to block 605.

At block 621, part of the change in the duty cycle of the PWM signal is reversed. By increasing the duty cycle of the PWM signal, the amplitude of the motor terminal voltage can be increased to provide a safety factor (e.g., a percentage or numerical increase) or buffer for hysteresis. The amount that the duty cycle is increased can be a smaller amount than the cumulative reductions in duty cycle from block 613. This can prevent the motor from operating at one or more operating limits.

At block 623, it can be determined if the motor current $I_m$ fluctuates. This can be caused, for example, in response to changes in the load. For example, increases in the load can cause the motor terminal current $I_m$ to increase. Minor fluctuations in the load can be ignored, for example, when the motor operates with a safety margin or buffer capacity to accommodate minor fluctuations in the load. The motor current $I_m$ can be tracked and stored in the memory (e.g., for reporting, for historical comparisons to determine a rate of change). The motor current $I_m$ can be measured by a sensor and provided to the DSP. The fluctuations or changes in $I_m$ can be detected to determine if a threshold change in $I_m$ is achieved. In some embodiments, a threshold change can be determined by comparing a present motor terminal current $I_m$ against a baseline motor current that was measured when the maximum change in the amplitude of the motor terminal voltage was reached (e.g., at block 613, 616, 617, or 619) or when part of the change was reversed (e.g., at block 621). In some embodiments, the fluctuation in the motor current $I_m$ is measured as a rate of change. The change in the motor current can be compared to a third threshold change amount (e.g., such as the first threshold change amount, the second threshold change amount, or a different change amount). If the motor current $I_m$ remains stable, then the method can loop to block 623 such that the motor terminal voltage can continue to be maintained at an efficient value until the motor current becomes unstable and fluctuates. If the motor current $I_m$ fluctuates, then the method can proceed to block 605 to restore the full duty cycle and provide full amplitude to the motor terminal voltage $V_m$ so that the motor has maximum power to drive a newly changed load.

Results

Using a power management system, such as shown in FIG. 4, with a three-phase induction motor can provide many features. For example, the motor can use less power. As another example, the motor can operate at a lower temperature, which can improve the lifespan of the motor. In some embodiments, a power management system can be used to control the speed of the motor, set ramp up and ramp down times for the motor to start up and shut down, provide a soft start option, reduce inrush current, provide overload protection, provide limit protection, adjust to fluctuating loads, adjust functionality according to user-programmable inputs, set the motor to operate with a safety margin away from limits, and reduce operating vibrations. The power management system can report the performance of a motor, record and report current and historical performance of a motor, calculate power savings from efficiency, calculate financial savings from efficiency, calculate carbon dioxide emissions savings from efficiency, etc. In some embodiments, the power management system can generate reports related to the operation and performance of the power management system or motor, such as the frequency, voltages, currents, efficiencies, power, load, PWM signals, speed, etc. In some embodiments, the power management system can provide output through various output devices including wired devices such as display screens, networked devices such as computers, and wirelessly connected devices such as smartphones or tablets.

Figure 7:
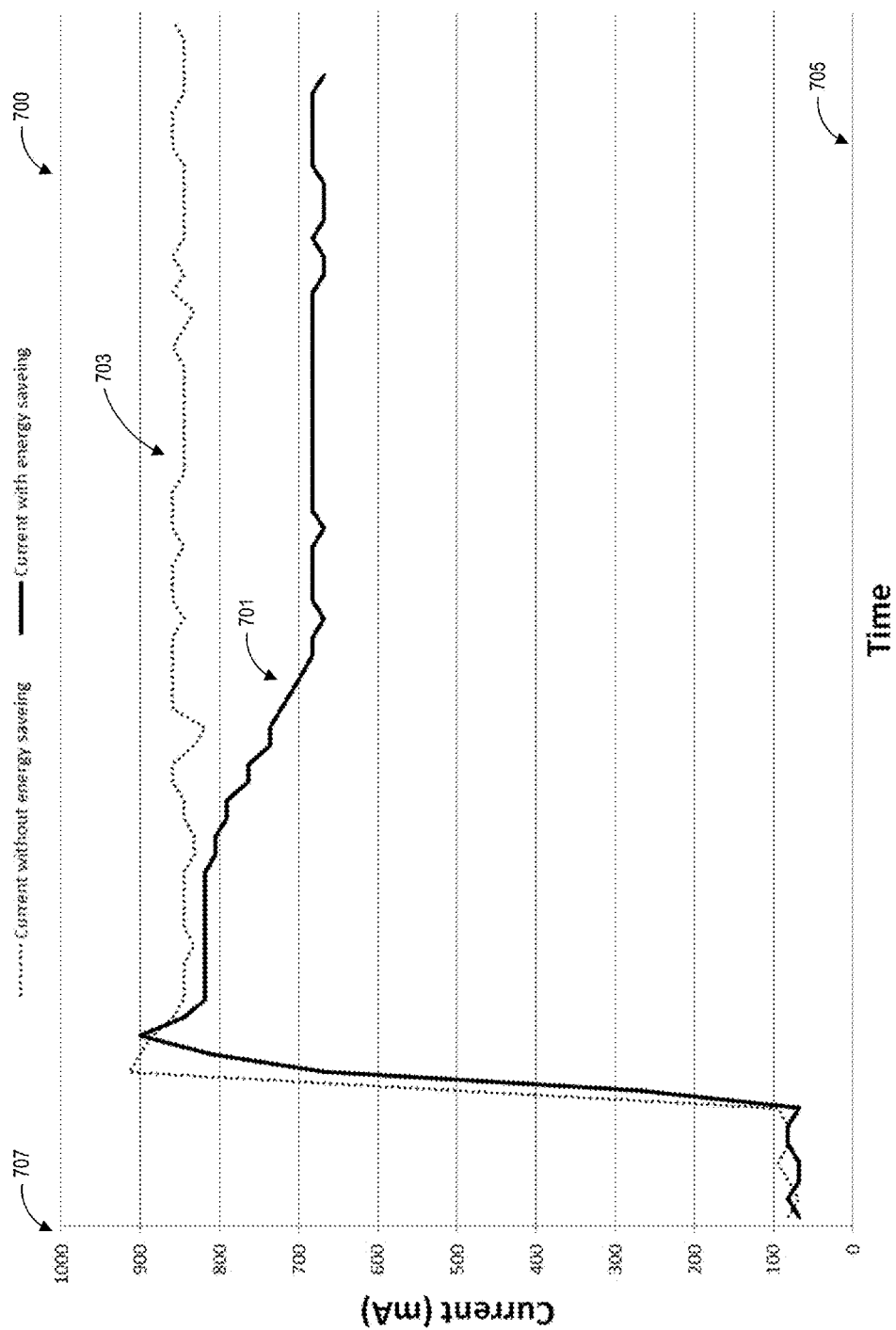
FIG. 7 is a graph showing results of a test of an embodiment disclosed herein.

FIG. 7 shows a graph 700 of results from an example test. The X-axis 705 indicates a time span of approximately 60 seconds. The Y-axis 707 indicates a current measurement in milliamps. A first curve 701 indicates a measured current provided to a power management system coupled to a three-phase induction motor. A second curve 703 indicates the measured current provided to the same three-phase induction motor without using the power management system.

The test equipment included a 1.5 kW, 220 V, three-phase power management system coupled to a 0.75 kW, 220 V, three-phase delta connected fan motor driving a circulation fan for an oven. During a first test, the motor powered the fan without the power management system. During a second test, the motor powered the fan while a power management system controlled the power provided to the motor.

Without the power management system, the second curve 703 indicates that the current peaked around 900 mA and then settled around approximately 853 mA. With the power management system, the first curve indicates that the current peaked around 900 mA and reached a steady state just below 853 mA. The power management system then managed the AC motor signal based on the load connected to the motor and further reduced the current over the next several seconds to approximately 684 mA.

Figure 8:
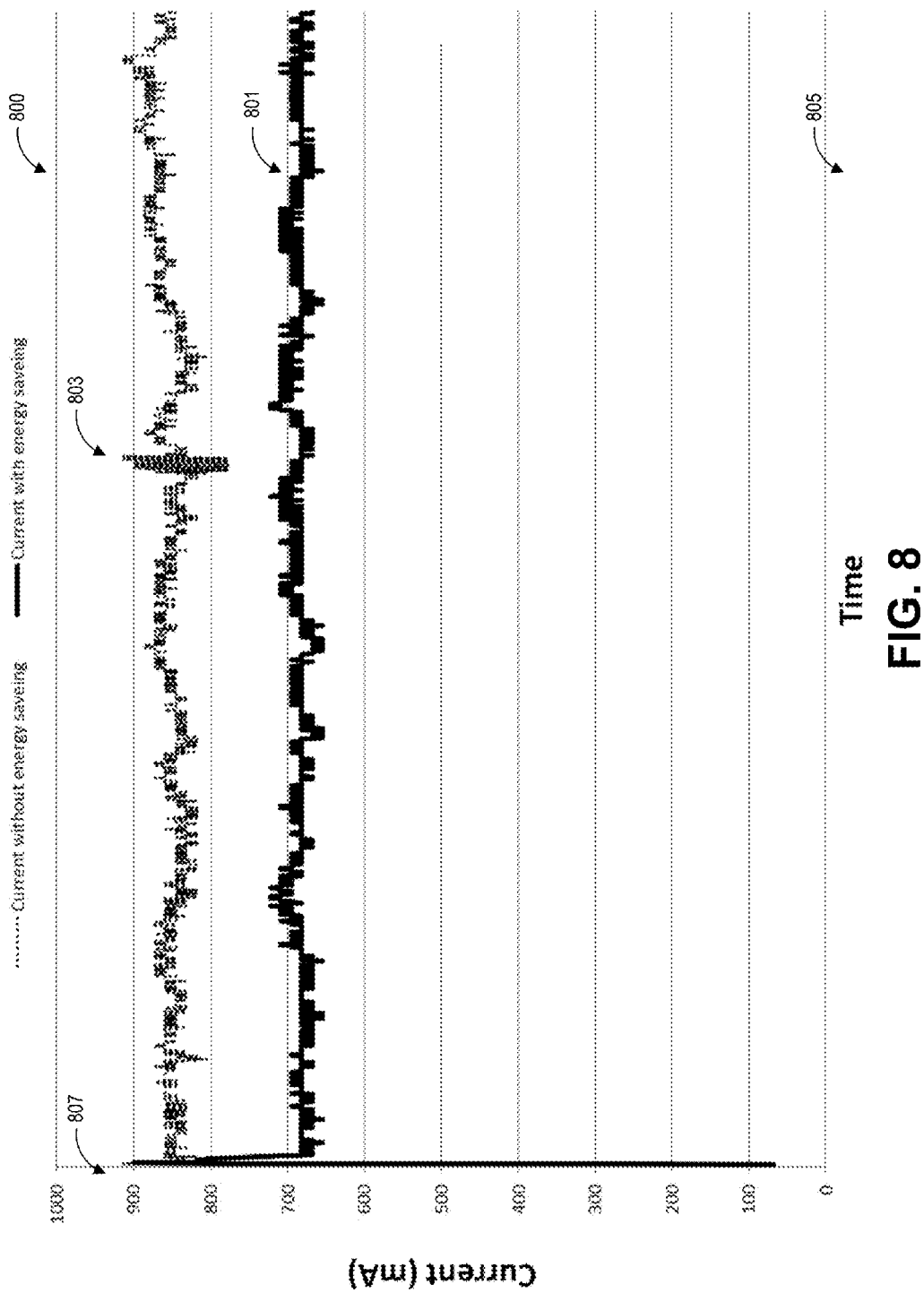
FIG. 8 is a graph of results from the test of FIG. 7 over an extended time period of about 1 hour.

FIG. 8 shows a graph 800 of results from the example test over an extended time period of about 1 hour. The X-axis 805 indicates a time span of approximately 60 minutes. The Y-axis 807 indicates a current measurement in milliamps. A first curve 801 indicates a measured current provided to a power management system coupled to a three-phase induction motor. A second curve 803 indicates the measured current provided to the same three-phase induction motor without using the power management system. Accordingly, a power savings of about 19% was achieved in the example test by using the power management system to reduce the motor terminal voltage provided to the motor while still supplying the necessary power demanded by the load.

Figure 9A:
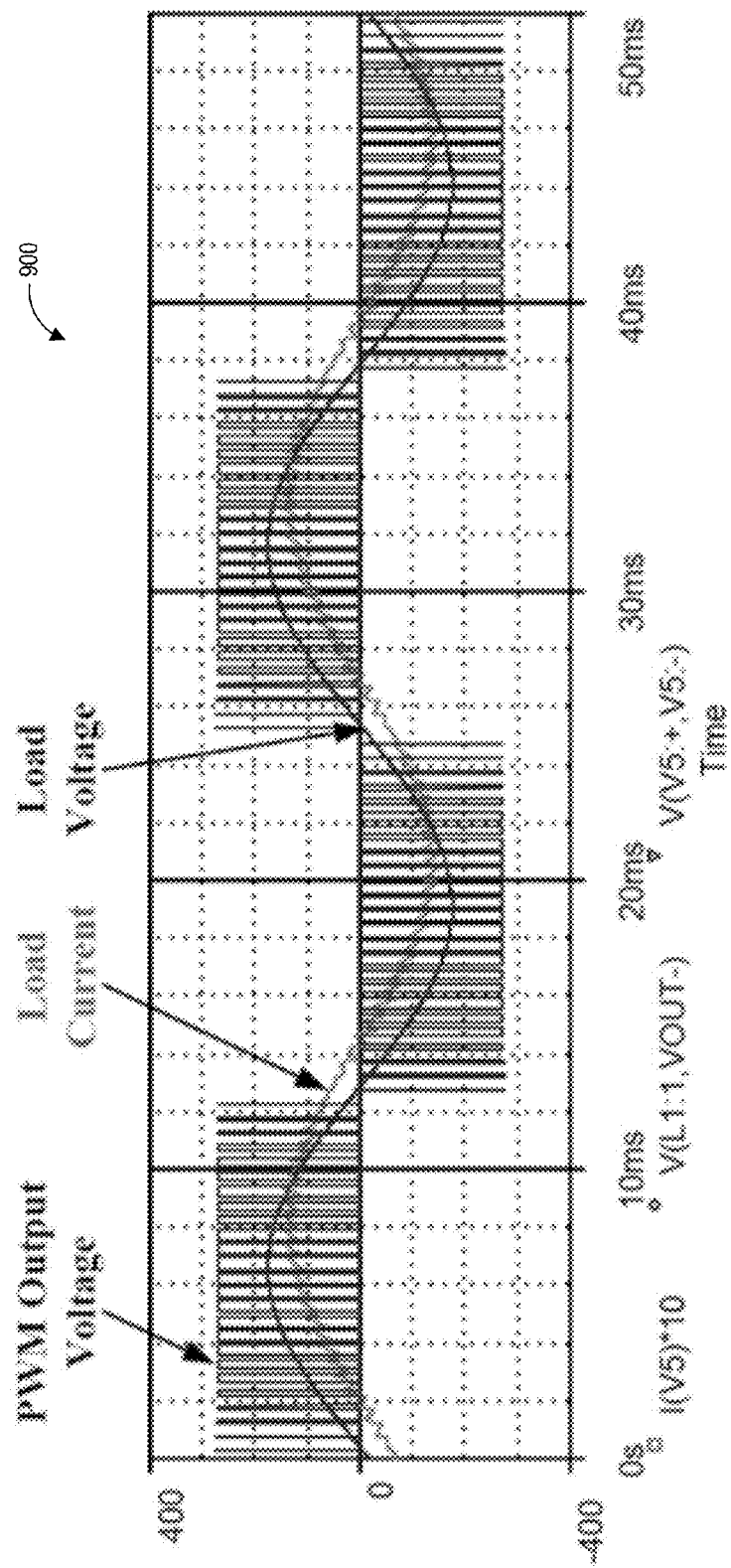
FIG. 9A is a graph illustrating signals generated by an embodiment of an example power management system.

FIG. 9A shows a graph 900 of signals for an example power management system. The graph 900 includes a "PWM output voltage," a "load current," and a "load voltage." The PWM output voltage can be, for example, the voltage of one of the PWM signals PWM-A, PWM-B, PWM-C, or their complements generated by the DSP 439 shown in FIG. 4. The load current can be, for example, the motor current $I_m$ of the AC motor signal 433, 435, or 437 shown in FIG. 4. The load voltage can be, for example, the voltage of the AC motor signal 433, 435, or 437 shown in FIG. 4. As disclosed herein, the duty cycle of the PWM output voltage can be adjusted to increase or decrease load voltage to increase the power factor until one or more limit conditions are reached. Changing the duty cycle of the PWM output voltage can be adjusted to increase or decrease load voltage can cause changes in the load current that vary based on whether or not certain limit conditions are reached. The load current can be drawn by the motor in accordance with the demands of the load and can be indirectly affected by the direct control of the motor terminal voltage.

FIG. 9B shows a graph 950 of an AC motor signal voltage (solid line) and AC motor signal current (dotted line). Initially at 951, a DC-AC-DC converter can be powered on such that voltage and current are provided. There may be inrush current and/or voltage instability at 953. After a short period, a steady state condition may be reached at 955. After the steady state is reached, the AC motor voltage can be gradually reduced 957. Although the graph shows discrete reduction increments, in some embodiments, an analog reduction can be used. At time 959, the voltage has reduced to a point where a current instability occurs. The current instability can be, for example, an increase such as 1%, 3%, 5%, 10%, etc. above the steady state current. The current instability can be, for example, when the rate of the change in current over time exceeds a threshold amount in amps/sec. The current instability can also be, for example, when the rate of the change in current per change in voltage exceeds a threshold amount. In some embodiments with lower thresholds, the instability can be detected shortly before time 959 based on the current ripples or small increases in current. In some embodiments, the current instability can be determined when the current deviates more than 1%, 3%, 5%, 10%, etc. for a given voltage change or compared to the current when a previous voltage was provided. In response to detecting the current instability, at time 961, the decrease in the voltage can be at least partially reversed, and the current can settle to a stable value and/or remain within a threshold limit. The voltage can then be held constant until a current instability is detected again at time 963, and in response, a first or full voltage can be provided.

User Interface

Figure 10:
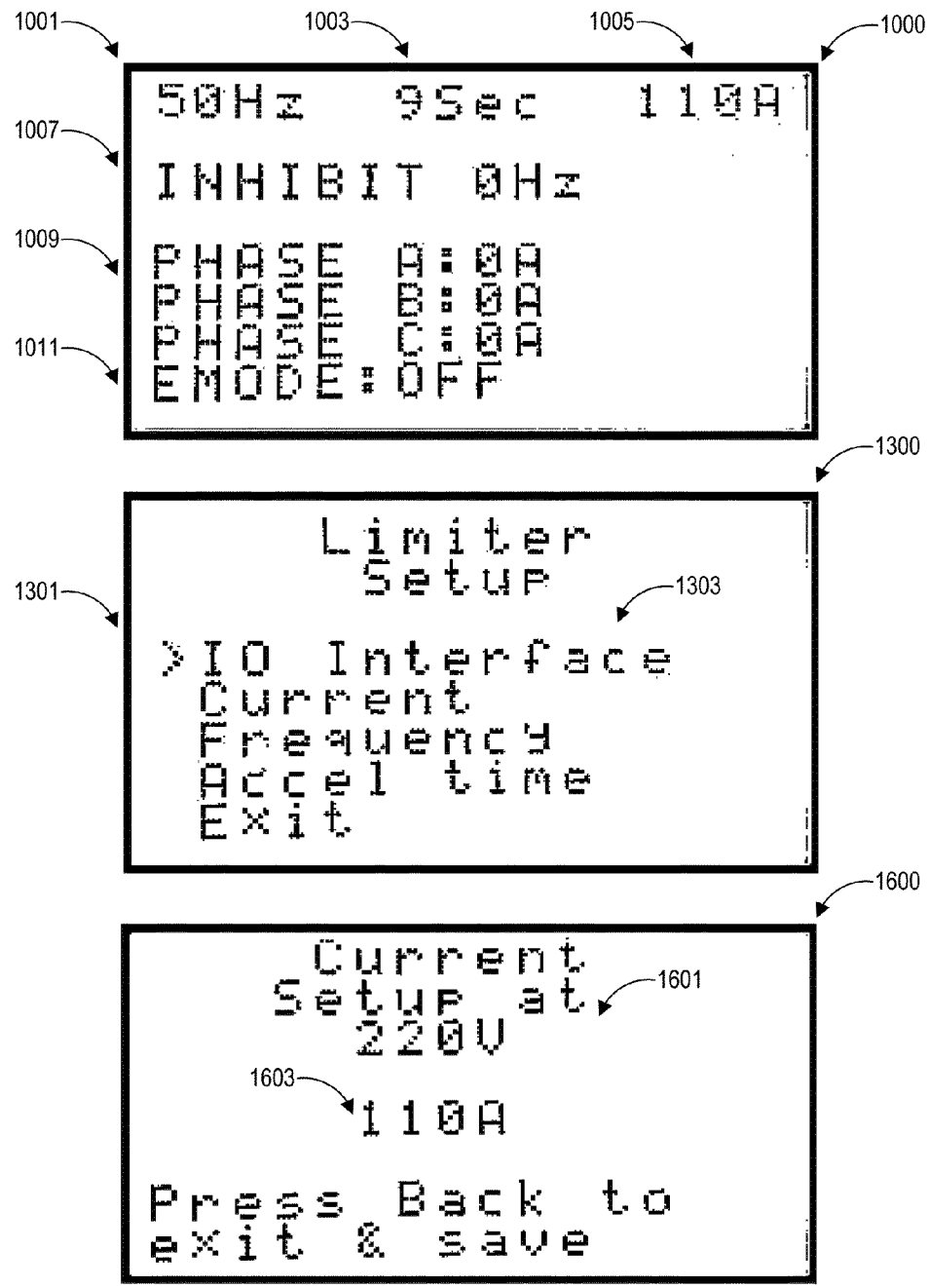
FIG. 10 shows example user interfaces of a power management system.

FIG. 10 shows example user interfaces 1000, 1300, 1600 of a power management system. The user interfaces include a home screen 1000, a parameter setup screen 1300, and a parameter example screen 1600.

The home screen 1000 can include indicators to display and/or receive a user input to configure a frequency 1001, a ramp up time 1003, and a motor rated current $I_{rm}$ 1005. The home screen can also include an inhibit option 1007 to inhibit, stop, or run the unit. The home screen can also include indications of the running currents input to (e.g., AC power inputs 405 of FIG. 4) or output from (e.g., AC motor signals 433, 435, 437 of FIG. 4) the power management system. An energy mode indicator 1007 can show if the power management system is off, analyzing, or on.

The parameter setup screen 1300 can include a cursor. A user can use the cursor to select from one or more parameters 1303 to view or edit. Parameters can include, for example, I/O interface parameters, current parameters, frequency parameters, acceleration time parameters, etc.

The parameter example screen 1600 show a selected parameter, for example, one of the parameters 1303. The parameter example screen 1600 can show some of the measured or calculated parameters 1601, such as a voltage, and allow for a user to edit other parameters 1603, such as a current.

Additional Details

The Technical Field, Description of Related Technology, Summary, Brief Description of the Drawings, and the Detailed Discussion may describe various aspects of technology, no single one of which is solely responsible for all desirable attributes. Accordingly, these sections provide a non-limiting disclosure of examples and features.

Although certain embodiments and examples are discussed, the subject matter extends beyond the specifically disclosed embodiments to other alternative embodiments and/or uses and to modifications and equivalents thereof. Thus, the scope of the claims appended hereto is not limited by any of the particular embodiments. For example, the structures, systems, and/or devices described herein may be embodied as integrated components or as separate components. For purposes of comparing various embodiments, certain aspects, advantages, and features of these embodiments are described. Not necessarily all such aspects, advantages, or advantages are achieved by any particular embodiment. Thus, for example, various embodiments may be carried out in a manner that achieves or optimizes one or a group of aspects, advantage or features as taught herein without necessarily achieving other aspects, advantages or features as may also be taught or suggested herein.

While some circuits schematics are provided for illustrative purposes, other equivalent circuits can alternatively be implemented to achieve the functionality described herein. For example, different types of switches, diodes, and processors can be used. The blocks such as the AC to DC rectifier and DC to AC inverter can vary in design. The DSP can be hard-wired, a micro-processor, a specially programmed general purpose processor, etc.

Various embodiments of the present disclosure can include a system, a method, and/or a computer program product at any possible technical detail level of integration. The computer program product may include a computer readable storage medium (or mediums) having computer readable program instructions thereon for causing a processor such as a DSP to carry out aspects of the present disclosure.

For example, some of the functionality described herein may be performed as software instructions are executed by, and/or in response to software instructions being executed by, one or more hardware processors and/or any other suitable computing devices such as one or more DSP's. The software instructions and/or other executable code may be read from a computer readable storage medium (or mediums). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

In any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not necessarily be construed to imply that these operations are order dependent.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustrations and combinations of blocks in the block diagrams and/or flowchart illustrations can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

The terminology used in the description presented herein is not intended to be interpreted in any limited or restrictive manner, simply because it is being utilized in conjunction with a detailed description of certain specific embodiments of the disclosure. In this description, reference is made to the drawings where like reference numbers can indicate identical or functionally similar elements. It will be understood that elements illustrated in the figures are not necessarily drawn to scale. Moreover, it will be understood that certain embodiments can include more elements than illustrated in a drawings and/or a subset of the illustrated elements in a particular drawing. Further, embodiments can incorporate any suitable combination of features from two or more drawings.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each is present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected", as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. All numerical values provided herein are intended to include similar values within a measurement error.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A motor system comprising:
   a three phase induction motor comprising:
      a stator;
      a rotor positioned, at least partially, within the stator;
      a first winding configured to impose a first electromagnetic force on the rotor in response to an first alternating current ("AC") motor signal supplied to the first winding;
      a second winding configured to impose a second electromagnetic force on the rotor in response to a second AC motor signal supplied to the second winding; and
      a third winding configured to impose a third electromagnetic force on the rotor in response to a third AC motor signal supplied to the third winding;
   an AC-DC-AC power delivery system configured to power the three-phase induction motor, the power delivery system comprising:
      an AC to direct current ("DC") power rectifier configured to convert a supplied AC power signal into a DC power signal; and
      a DC to AC power inverter configured to:
         receive a first pulse width modulated (PWM) signal;
         receive a second PWM signal;
         receive a third PWM signal;
         convert the DC power signal into the first AC motor signal, wherein a voltage amplitude of the first AC motor signal is based, at least in part, on a duty cycle of the first PWM signal;
         convert the DC power signal into the second AC motor signal, wherein a voltage amplitude of the second AC motor signal is based, at least in part, on a duty cycle of the second PWM signal;
         convert the DC power signal into the third AC motor signal, wherein a voltage amplitude of the third AC motor signal is based, at least in part, on a duty cycle of the third PWM signal;
         wherein the first AC motor signal, the second AC motor signal, and the third AC motor signal are out of phase with each other;
   a sensor configured to:
      detect a electrical current of at least one of the first, second, or third AC motor signals; and
      generate a motor current signal indicative of the electrical current;

a digital signal processor (DSP) configured to:
receive the motor current signal;
generate the first, second, and third PWM signals at a maximum duty cycle;
decrease, by a first amount, the duty cycles of the first, second, and third PWM signals until the motor current signal fluctuates, wherein decreasing the duty cycles of the first, second, and third PWM signals causes a decrease in the voltage amplitudes of the first, second, and third AC motor signals; and
increase, by a second amount that is smaller than the first amount, the duty cycles of the first, second, and third PWM signals, thereby stabilizing the motor current signal at a first level for a constant motor load.

2. The motor system of claim 1, wherein the DSP is configured to change the duty cycles of the first, second, and third PWM signals while holding constant a carrier frequency of the first, second, and third PWM signal and a while holding constant a DC voltage of the PWM signal.

3. The motor control system of claim 1, wherein the AC to DC power rectifier is configured to receive a three phase input AC power signal that has a steady amplitude and a steady frequency while the voltage amplitudes of the first, second, and third AC motor signals are decreased.

4. The motor control system of claim 1, further comprising an isolated driver stage coupled to the DSP and also coupled to the inverter, the isolated driver stage configured to:
receive the first, second, and third PWM signals generated by the DSP;
drive the first, second, and third, PWM signals to the inverter; and
provide isolation for the PWM signal between the DSP and the inverter.

5. The motor control system of claim 1, further comprising:
a user input device for providing a user input; and
a memory configured to store a motor rated power factor, wherein the motor rated power factor is determined, based at least in part, on the user input; and
wherein the DSP is further configured to:
calculate a first voltage amplitude for the AC motor signal based, at least in part, on the duty cycles of the first, second, and third PWM signals;
calculate a motor power factor based, at least in part, on the first voltage amplitude and the motor current signal;
compare the motor power factor to the motor rated power factor; and
in response to the comparison of the motor power factor to the motor rated power factor, set the duty cycle of the PWM signal to be the maximum duty cycle.

6. The motor control system of claim 1, further comprising:
a user input device for providing a user input; and
a memory configured to store a motor rated current, wherein the motor rated current is determined, based at least in part, on the user input; and
wherein the DSP is further configured to:
compare the motor current signal to the motor rated current; and
in response to the comparison of the motor power current to the motor rated current, set the duty cycle of the PWM signal to be the maximum duty cycle.

7. A motor control system comprising:
an AC-DC-AC power delivery system configured to power a three-phase induction motor, the power delivery system comprising:
an alternating current ("AC") to direct current ("DC") power rectifier configured to convert a supplied AC power signal into a DC power signal; and
a DC to AC power inverter configured to receive a pulse width modulated (PWM) signal, convert the DC power signal into an AC motor signal, and supply the AC motor signal to the three-phase induction motor, wherein a voltage amplitude of the AC motor signal is based, at least in part, on a duty cycle of the PWM signal;
a sensor configured to detect a motor current of the AC motor signal; and
a digital signal processor (DSP) configured to:
receive an indication of the motor current;
generate the PWM signal at a first duty cycle;
change the duty cycle of the PWM signal until the motor current fluctuates, wherein changing the duty cycle causes a decrease in the voltage amplitude of the AC motor signal; and
reverse at least a part of the change in the duty cycle of the PWM signal, thereby stabilizing the motor current at a first level.

8. The motor control system of claim 7, wherein the DSP is configured to:
change the duty cycle of the PWM signal until the motor current fluctuates, wherein changing the duty cycle of the PWM signal comprises decreasing the duty cycle of the PWM signal by a first amount; and
reverse at least a part of the change in the duty cycle of the PWM signal, wherein reversing at least a part of the change in the duty cycle of the PWM signal comprises increasing the duty cycle of the PWM signal by a second amount to decrease the motor current to reach the first level; and
wherein the second amount is smaller than the first amount.

9. The motor control system of claim 8, wherein the DSP is configured to change the duty cycle of the PWM signal while holding constant a carrier frequency of the PWM signal and a DC voltage of the PWM signal.

10. The motor control system of claim 7, wherein the AC to DC power rectifier is configured to receive an AC power signal that has a steady amplitude and a steady frequency.

11. The motor control system of claim 7, further comprising an isolated driver stage coupled to the DSP and also coupled to the inverter, the isolated driver stage configured to:
receive the PWM signal generated by the DSP;
provide the PWM signal to the inverter; and
provide isolation for the PWM signal between the DSP and the inverter.

12. The motor control system of claim 7, wherein the first duty cycle is a full duty cycle.

13. The motor control system of claim 7, further comprising:
a user input device; and
a memory configured to store a value for the first duty cycle, wherein the value is determined, based at least in part, on a user input made through the user input device.

14. The motor control system of claim 7, further comprising:
a user input device for providing a user input; and
a memory configured to store a motor rated power factor, wherein the motor rated power factor is determined, based at least in part, on the user input; and
wherein the DSP is further configured to:
calculate a first voltage amplitude for the AC motor signal based, at least in part, on the duty cycle of the PWM signal;
calculate a motor power factor based, at least in part, on the first voltage amplitude and the motor current;
compare the motor power factor to the motor rated power factor; and
in response to the comparison of the motor power factor to the motor rated power factor, set the duty cycle of the PWM signal to be the first duty cycle.

15. The motor control system of claim 7, further comprising:
a user input device for providing a user input; and
a memory configured to store a motor rated current, wherein the motor rated current is determined, based at least in part, on the user input; and
wherein the DSP is further configured to:
compare the motor current to the motor rated current; and
in response to the comparison of the motor power current to the motor rated current, set the duty cycle of the PWM signal to be the first duty cycle.

16. The motor control system of claim 7, wherein the DSP is further configured to, after reversing at least a part of the change in the duty cycle of the PWM signal and thereby stabilizing the motor current at the first level:
detect an instability in the motor current; and
in response to the detection, set the duty cycle of the PWM signal to be the first duty cycle.

17. The motor control system of claim 7, wherein the DSP is further configured to perform a soft start, wherein performing the soft start comprises changing the duty cycle of the PWM signal to gradually reach the first duty cycle over a time period.

18. A method for controlling a three-phase induction motor, the method comprising:
converting a DC power supply signal into an AC motor signal, wherein an voltage amplitude of the AC motor signal is determined, based at least in part, on the duty cycle of a pulse width modulated (PWM) signal;
supplying the AC motor signal to the three-phase induction motor;
generating the PWM signal at a first duty cycle;
sensing a current of the AC motor signal supplied to the three-phase induction motor;
in response to the motor reaching a steady state, changing the duty cycle of the PWM signal such that the voltage amplitude of the AC motor signal is decreased and a power factor of the three-phase induction motor is increased;
reversing at least a portion of the change to set the duty cycle of the PWM signal at a second duty cycle, the reversing being performed in response to at least one of:
an instability in a current of the AC motor signal; or
a motor power factor reaching a programmed limit;
detecting that the current of the AC motor signal is unstable while the PWM signal is set at the second duty cycle; and
in response to the detection, setting the duty cycle of the PWM signal to be the first duty cycle.

19. The method of claim 18, further comprising:
receiving an AC supply signal from an AC power supply; and
converting the AC supply signal into the DC power supply signal.

20. The method of claim 18,
wherein changing the duty cycle of the PWM signal such that the voltage amplitude of the AC motor signal is decreased and a power factor of the three-phase induction motor is increased comprises continuously or repeatedly decreasing the duty cycle of the PWM signal; and
wherein reversing at least a portion of the change to set the duty cycle of the PWM signal at a second duty cycle comprises increasing the duty cycle of the PWM signal, thereby decreasing the motor current and decreasing the power factor; and
wherein the second duty cycle is less than the first duty cycle.

21. The method of claim 18, wherein the first duty cycle is a full duty cycle.

22. The method of claim 18, further comprising receiving a user input, wherein the first duty cycle is based, at least in part, on the user input.

23. The method of claim 18, further comprising receiving a user input, wherein the programed limit is based, at least in part, on the user input.

24. The method of claim 18, further comprising receiving a user input for a soft start option, wherein generating the PWM signal at the first duty cycle comprises gradually changing the duty cycle of the PWM signal to reach the first duty cycle over a time period, the time period being based, at least in part, on the user input.

25. The method of claim 18, further comprising:
calculating a voltage of the AC motor signal based, at least in part, on the duty cycle of the PWM signal;
comparing the voltage of the AC motor signal to a threshold voltage; and
in response to the comparison, setting the duty cycle of the PWM signal to be the first duty cycle.

26. A motor controller comprising:
a sensor configured to detect a motor current of an AC motor signal provided from a DC to AC power converter to a three-phase induction motor; and
a digital signal processor (DSP) configured to:
receive an indication of the motor current from the sensor;
generate a signal that controls a property of the AC motor signal;
a decrease a voltage amplitude of the AC motor signal until the motor current fluctuates; and
reverse at least a part of the decrease in the voltage amplitude of the AC motor signal, thereby stabilizing the motor current at a first level.

27. The motor controller of claim 26, wherein the signal that controls a property of the AC motor signal is a sinusoidal pulse width modulated signal.

28. The motor controller of claim 26, wherein the motor current is stabilized at the first level while the motor current does not deviate from the first level beyond a threshold amount.

29. The motor controller of claim 28, wherein the threshold amount is 5%.

* * * * *

UNITED STATES PATENT AND TRADEMARK OFFICE
CERTIFICATE OF CORRECTION

PATENT NO. : 9,673,743 B1
APPLICATION NO. : 15/429076
DATED : June 6, 2017
INVENTOR(S) : Terrence Hugh Billson It is certified that error appears in the above-identified patent and that said Letters Patent is hereby corrected as shown below:

In Column 28 at Line 52, Change "a decrease a voltage" to --decrease a voltage--.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*